(12) United States Patent
Vess

(10) Patent No.: US 8,362,396 B2
(45) Date of Patent: *Jan. 29, 2013

(54) APPARATUS AND METHOD FOR MAKING BAG ASSEMBLY

(75) Inventor: Mark A. Vess, Hanson, MA (US)

(73) Assignee: Covidien LP, Mansfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/112,237

(22) Filed: May 20, 2011

(65) Prior Publication Data

US 2011/0220540 A1    Sep. 15, 2011

Related U.S. Application Data

(63) Continuation of application No. 11/613,694, filed on Dec. 20, 2006, now Pat. No. 7,964,829.

(51) Int. Cl.
*B23K 33/00* (2006.01)
*H05B 6/62* (2006.01)

(52) U.S. Cl. .................................. 219/137 R; 219/769

(58) Field of Classification Search ................ 219/136, 219/137 PS, 765, 769, 137 R; 156/275.2, 156/273.7; 53/453, 477, 479
See application file for complete search history.

(56) References Cited

U.S. PATENT DOCUMENTS

| | | | |
|---|---|---|---|
| 2,422,525 A | 6/1947 | Brown et al. | |
| 2,764,862 A | 10/1956 | Rado | |
| 2,816,596 A | 12/1957 | Welch, Jr. | |
| 3,454,442 A | 7/1969 | Heller, Jr. | |
| 3,574,031 A | 4/1971 | Heller, Jr. et al. | |
| 3,583,458 A | 6/1971 | Costa | |
| 3,783,217 A | 1/1974 | Brown | |
| 3,945,867 A | 3/1976 | Heller, Jr. et al. | |
| 4,023,607 A | 5/1977 | Jensen et al. | |
| 4,091,804 A | 5/1978 | Hasty | |
| 4,126,167 A | 11/1978 | Smith et al. | |
| 4,352,669 A | 10/1982 | Norton | |
| 4,384,186 A | 5/1983 | Burt | |
| 4,390,832 A | 6/1983 | Taylor | |
| 4,417,122 A | 11/1983 | Thorne | |
| 4,417,753 A | 11/1983 | Bacehowski et al. | |
| 4,425,177 A | 1/1984 | Shinno | |
| 4,453,538 A | 6/1984 | Whitney | |
| 4,465,487 A | 8/1984 | Nakamura et al. | |
| 4,484,904 A | 11/1984 | Fowler | |
| 4,496,095 A | 1/1985 | Renshaw et al. | |
| 4,549,684 A | 10/1985 | Telly et al. | |
| 4,600,613 A | 7/1986 | Yoshida | |
| 4,645,482 A | 2/1987 | Yoshida | |
| 4,650,452 A | 3/1987 | Jensen | |
| 4,809,684 A | 3/1989 | Gardner et al. | |
| 4,836,691 A | 6/1989 | Suzuki et al. | |

(Continued)

OTHER PUBLICATIONS

Office action issued Jul. 19, 2010 in related U.S. Appl. No. 11/613,694. 23 pgs.

(Continued)

*Primary Examiner* — Sang Paik
(74) *Attorney, Agent, or Firm* — John Paul Mello

(57) ABSTRACT

An apparatus for forming a bag assembly includes opposing die members. Each opposing die member defines a single die and has a perimeter-welding portion for forming a perimeter-weld of the bag assembly and a tube-welding portion for forming a tube-weld of the bag assembly. During operation, the perimeter-welding and tube-welding portions weld the bag assembly simultaneously, then the perimeter-welding portion of one of the opposing die members is moved relative to the tube welding portion of the die member to increase the distance between the perimeter-welding portions of the opposing die members. When the perimeter-welding portions are moved apart, welding by the perimeter-welding portions is generally suspended while welding by the tube-welding portions may continue.

26 Claims, 23 Drawing Sheets

U.S. PATENT DOCUMENTS

| | | | |
|---|---|---|---|
| 4,846,160 A | 7/1989 | Gardner et al. |
| 4,876,788 A | 10/1989 | Steer et al. |
| 4,892,604 A | 1/1990 | Measells et al. |
| 4,950,347 A | 8/1990 | Futagawa |
| 4,979,953 A | 12/1990 | Spence |
| 5,047,605 A | 9/1991 | Ogden |
| 5,226,564 A | 7/1993 | Steer et al. |
| 5,278,382 A | 1/1994 | Rische et al. |
| 5,324,233 A | 6/1994 | Owensby et al. |
| 5,349,166 A | 9/1994 | Taylor |
| 5,354,260 A | 10/1994 | Cook |
| 5,427,645 A | 6/1995 | Lovin |
| 5,437,595 A | 8/1995 | Smith |
| 5,484,375 A | 1/1996 | Owensby et al. |
| 5,507,904 A | 4/1996 | Fisher et al. |
| 5,591,337 A | 1/1997 | Lynn et al. |
| 5,678,732 A | 10/1997 | Gianpaolo |
| 5,769,801 A | 6/1998 | Tumey et al. |
| 5,772,880 A | 6/1998 | Lynn et al. |
| 5,803,888 A | 9/1998 | Severs et al. |
| 5,931,797 A | 8/1999 | Tumey et al. |
| 5,976,300 A | 11/1999 | Buchanan et al. |
| 5,989,204 A | 11/1999 | Lina |
| 6,001,119 A | 12/1999 | Hampson et al. |
| 6,011,235 A | 1/2000 | Mukai et al. |
| 6,036,718 A | 3/2000 | Ledford et al. |
| 6,127,009 A | 10/2000 | Strassmann |
| 6,259,059 B1 | 7/2001 | Hsu |
| 6,486,456 B1 | 11/2002 | Moro et al. |
| 6,601,710 B2 | 8/2003 | Calhoun et al. |
| 6,652,942 B2 | 11/2003 | Ling et al. |
| 6,688,476 B2 | 2/2004 | Breillatt, Jr. et al. |
| 6,828,536 B1 | 12/2004 | Grimes et al. |
| 7,012,232 B1 | 3/2006 | Gruenspecht et al. |
| 7,041,936 B2 | 5/2006 | Oberzaucher et al. |
| 7,237,290 B2 | 7/2007 | Bichler |
| 7,353,946 B2 | 4/2008 | Cervantes |
| 7,399,375 B2 | 7/2008 | Leiser et al. |
| 7,586,071 B2 | 9/2009 | Gruenspecht et al. |
| 7,964,829 B2 | 6/2011 | Vess |
| 2004/0054306 A1 | 3/2004 | Roth et al. |
| 2004/0199090 A1 | 10/2004 | Sanders et al. |
| 2007/0038167 A1 | 2/2007 | Tabron et al. |
| 2007/0045240 A1 | 3/2007 | Smith et al. |
| 2007/0135835 A1 | 6/2007 | McEwen et al. |
| 2008/0269658 A1 | 10/2008 | Vinton et al. |

OTHER PUBLICATIONS

Response filed Sep. 30, 2010 to Office Action dated Jul. 19, 2010 from related U.S. Appl. No. 11/613,694. 18 pgs.

Office action issued Dec. 7, 2010 in related U.S. Appl. No. 11/613,694. 20 pgs.

Response filed Jan. 25, 2011 to Office Action dated Dec. 7, 2010 from related U.S. Appl. No. 11/613,694. 8 pgs.

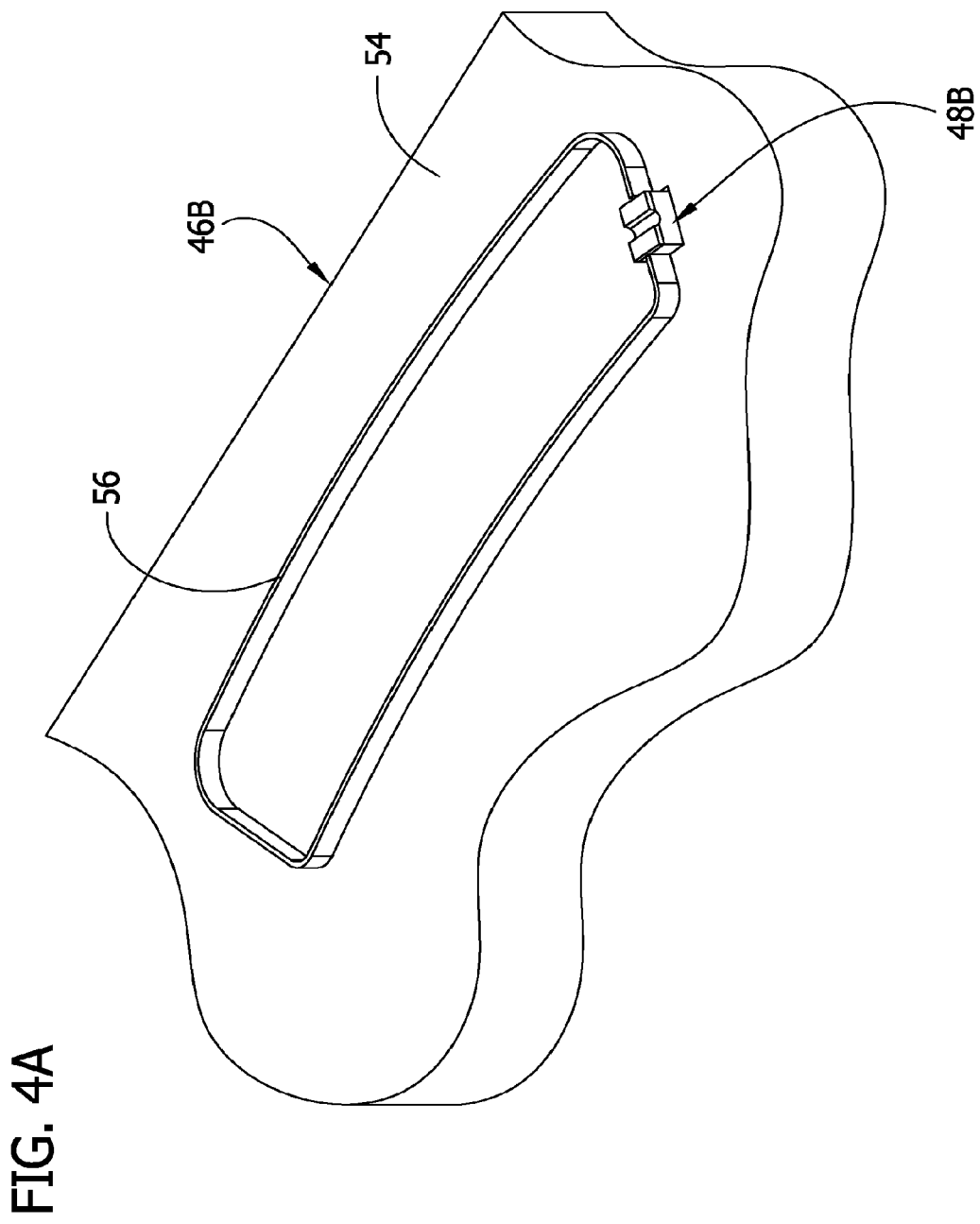

APPARATUS AND METHOD FOR MAKING BAG ASSEMBLY

CROSS-REFERENCE TO RELATED APPLICATIONS

This application is a continuation application of U.S. Ser. No. 11/613,694, filed Dec. 20, 2006, the entirety of which is incorporated herein by reference

FIELD OF THE INVENTION

The present invention generally relates to an apparatus for forming a bag assembly including a bag and a tube providing fluid communication with an interior of the bag.

BACKGROUND OF THE INVENTION

Welding by radiofrequency energy is an efficient and fast way to manufacture certain products. For example, radiofrequency energy may be used to weld certain polymeric materials, such as polyvinyl chloride (PVC), to make flexible bags for retaining fluid. For example, a bag or bladder for receiving pressurized air is incorporated into a vascular compression device for preventing pulmonary embolisms and deep vein thrombosis (DVT).

A bladder of a typical vascular compression device includes a pair of opposing polymeric sheets welded around their perimeters and a polymeric tube port welded between the sheets in fluid communication with the bladder. An exemplary process for forming the bladder uses a bladder die for welding the bladder together and a cylindrical mandrel for welding the polymeric sheets to the tube. At a first weld station, the cylindrical mandrel is inserted into the tube, and the mandrel and the tube are placed between the opposing sheets. A tube die is lowered to compress the tube and the mandrel between the sheets. Radiofrequency current is supplied to the mandrel to create a radiofrequency electric field between the mandrel and the die. The electric field heats the polymeric sheets and the tube, thereby welding the sheets to the tube. After the sheets are welded to the tube, the mandrel is removed from the tube and the subassembly is moved to a second welding station for forming the perimeter of the bladder. The subassembly is compressed between two opposing die members and radiofrequency current is directed to the die members to form a perimeter-weld.

The use of a cylindrical mandrel is inefficient and time-consuming because of the difficulties in both inserting the mandrel into the tube and removing the mandrel from the tube after the process. Moreover, at least two distinct welding operations are required to form the bladder. Moreover still, the mandrel must be connected to a source of radiofrequency energy.

In another process, the mandrel is replaced by a rigid, non-deformable tubular insert that is received in the tube. Like the above process, radiofrequency energy is supplied to a die to create an electric field. However, in this process, the die includes portions that surround the tube and the tubular insert and direct the radiofrequency electric field into the tube and the sheets surrounding the tube to weld them together.

Although this process purportedly welds both the bladder and the tube to the bladder at the same time and in one step, the use of a tubular insert, without more, is not sufficient to weld both the bladder and the sheets to the tube. Welding the sheets to the tubing takes longer than welding the bladder because the tube is typically thicker than the polymeric sheet. If the process lasted long enough to adequately weld the sheets to the tubing, then there is a likelihood that the die will cut or at least weaken the bladder at the bladder perimeter because of the amount of time the sheets would be subjected to the electric field.

SUMMARY OF THE INVENTION

In one aspect, a method of forming a bag assembly comprising a bag and a tube providing fluid communication with an interior of the bag generally comprises forming a subassembly by positioning at least a portion of the tube between a pair of opposed sheets. Placing the subassembly between a first die member and a second die member opposing said first die member where the first and second die members each define a single die. Pressing the subassembly with the first and second die members. Applying an electric field between the first and second die members in a first location for heating the pair of sheets along a path to weld the pair of sheets together to define a perimeter of the bag and in a second location for welding the tube to the pair of sheets. And moving a portion of one of the opposing first and second die members in the first location away from the other of the first and second die members in the first location to reduce the heating of the pair of sheets at the first location while maintaining a spacing between portions of the opposing first and second die members in the second location to continue welding at the second location.

In another aspect, an apparatus for forming a bag assembly including a bag formed from opposing sheets welded together along a perimeter-weld and a tube welded to the opposing sheets along a tube-weld for providing fluid communication with an interior of the bag generally comprises a die including a first die member and a second die member opposing the first die member. The first and second die members each define a single die. The first die member and the second die member having opposing tube-welding portions for welding the opposing sheets to the tube, and opposing perimeter-welding portions for welding the opposing sheets together to define the bag. The first die member and second die member are disposed for relative movement toward one another to press the opposing sheets and tube and away from one another. The perimeter-welding portion of the first die member is movable relative to the tube-welding portion of the first die member when the first die member and the second die member press the opposing sheets and tube to permit an increase in spacing between the perimeter-welding portion of the first die member and the perimeter-welding portion of the second die member so that welding of the opposing sheets by the perimeter-welding portions is suspended while welding by the tube-welding portions continues. A source of radiofrequency current is electrically connected to at least one of the first and second die members for applying a radiofrequency electric field to the opposing sheets and tube when the first and second die members press the opposing sheets and tube for welding the opposing sheets and tube.

In yet another aspect, a tube assembly for a device for holding fluid comprises a tube with at least an axial portion thereof being capable of being welded by a high frequency electric field. A tubular insert inside the tube extends along an entirety of the axial portion of the tube. The tubular insert is resiliently deformable for restorative movement from a generally collapsed, flattened configuration for facilitating welding to an open configuration to facilitate fluid flow past the tubular insert.

Other features will be in part apparent and in part pointed out hereinafter.

BRIEF DESCRIPTION OF THE DRAWINGS

FIG. 4A is an enlarged, fragmentary perspective of a lower die member of the welding apparatus;

Corresponding reference characters indicate corresponding parts throughout the drawings.

DETAILED DESCRIPTION OF THE DRAWINGS

Figure 1:
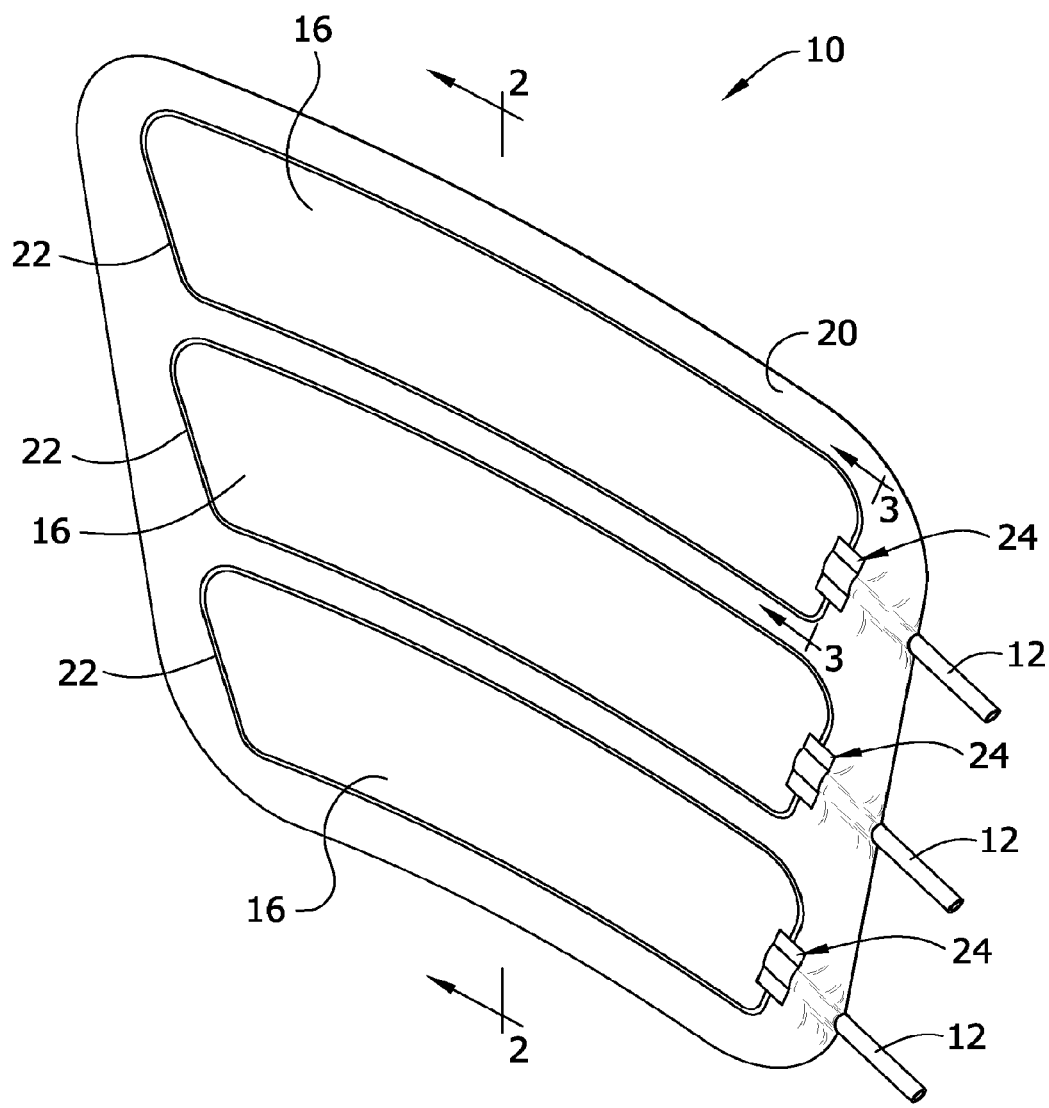
FIG. 1 is a perspective of one embodiment of a bladder assembly.
Figure 2:
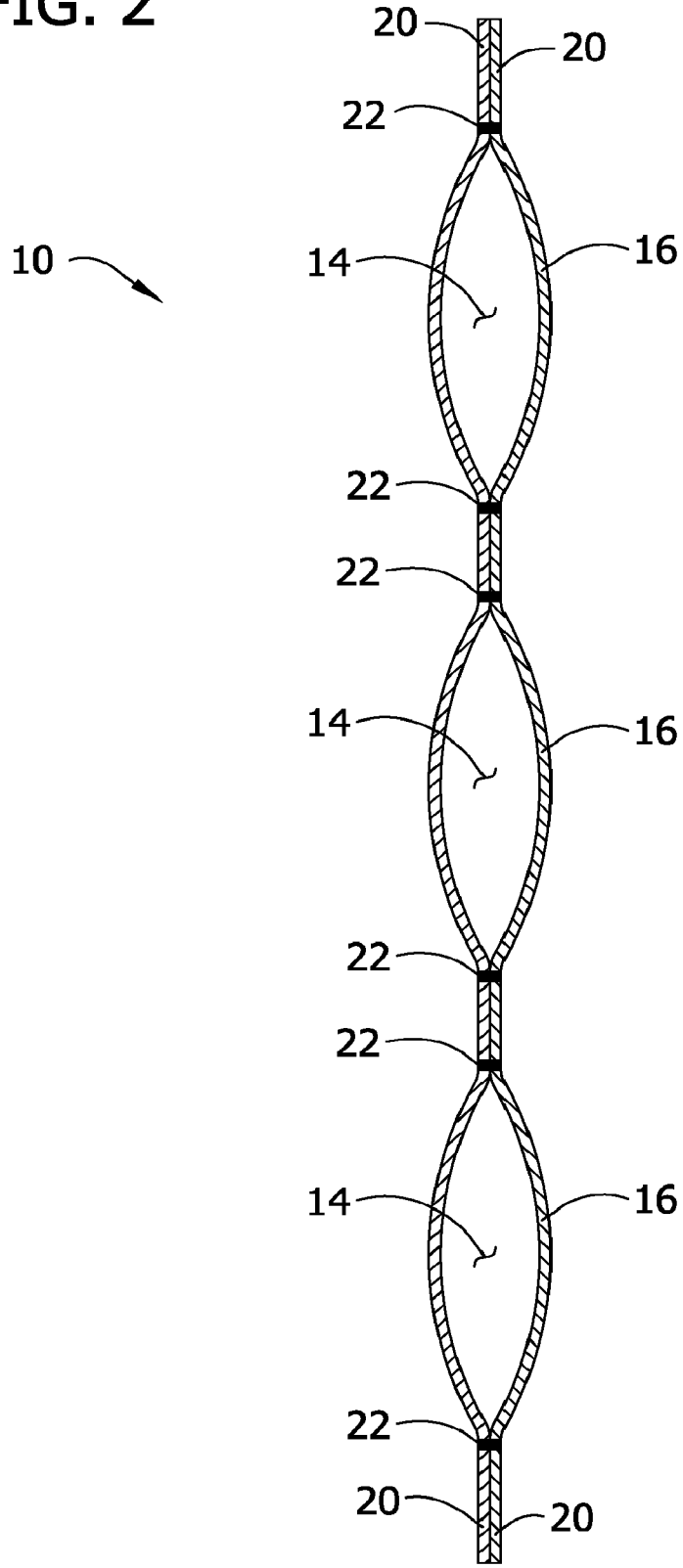
FIG. 2 is a section of the bladder assembly taken in the plane including the line 2-2 of FIG. 1.
Figure 3:
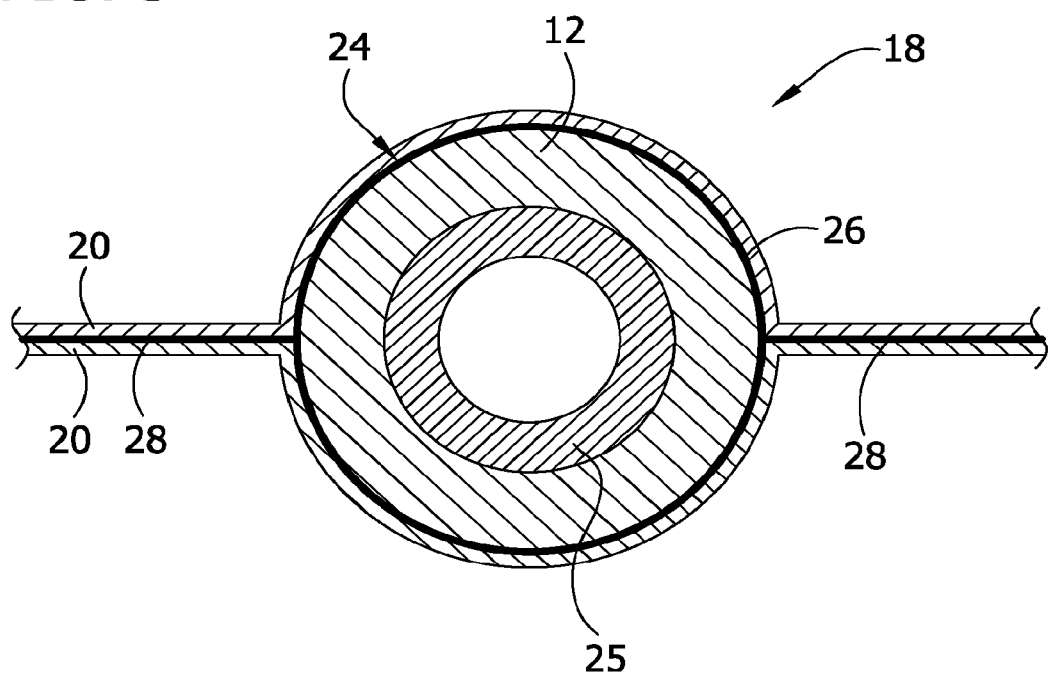
FIG. 3 is an enlarged fragmentary section of the bladder assembly taken in the plane including the line 3-3 of FIG. 1.

Referring now to the drawings, and in particular to FIGS. 1-3, a bladder assembly (broadly, "bag assembly") is generally indicated at 10. The bladder assembly is constructed for use with a vascular compression device. As shown in FIG. 1, the assembly 10 includes three tubes 12, each being in fluid communication with an interior 14 (FIG. 2) of a respective bladder 16 of the bladder assembly at a tube port, generally indicated at 18 (FIG. 3). Opposed sheets 20 are welded together along perimeter-welds 22 to define the three bladders 16 (FIGS. 1 and 2). It will be understood that the bladders 16 in the bladder assembly 10 can be of any desired number, as can the number of tubes 12 in each bladder. The use of a bag assembly for other than a vascular compression device, including use to hold a liquid, is within the scope of the present invention.

Each tube 12 includes a tubular insert 25 for use in welding the sheets 20 to the tube. The tubular insert 25 is explained in more detail below. The tubes 12 are welded between the opposed sheets 20 at tube-welds, generally indicated at 24, so that each of the tubes is sealed with the interior 14 of one of the bladders 16, and fluid communication with the interior of the bladder occurs only through the tube (FIGS. 1 and 3). Each tube-weld 24 includes a circumferential-weld area 26 that extends around a circumference of the tube 12 and a pair of opposed lateral-weld areas 28 that extend laterally from the circumferential-weld area at opposite lateral sides of the tube. The lateral-weld areas 28 are contiguous with the circumferential-weld area 26. At a later stage of production of the vascular compression device, a connector (not shown) may be secured to ends of the tubes 12. The connector secures the tubes to an air compressor for introducing pressurized air into the bladders 16. As is known to those skilled in the art, other layers of material may be applied onto the bladder assembly 10 to complete production of the vascular compression device. Moreover, the sheets 20 forming the bladders 16 may have any number of layers of material. Moreover still, instead of securing full length tubes 12 to the sheets 20, short pieces of tubing (not shown) may be secured to the sheets, and at a later stage of production, full length tubes may be secured to the short pieces. Other arrangements are within the scope of the invention.

Figure 4:
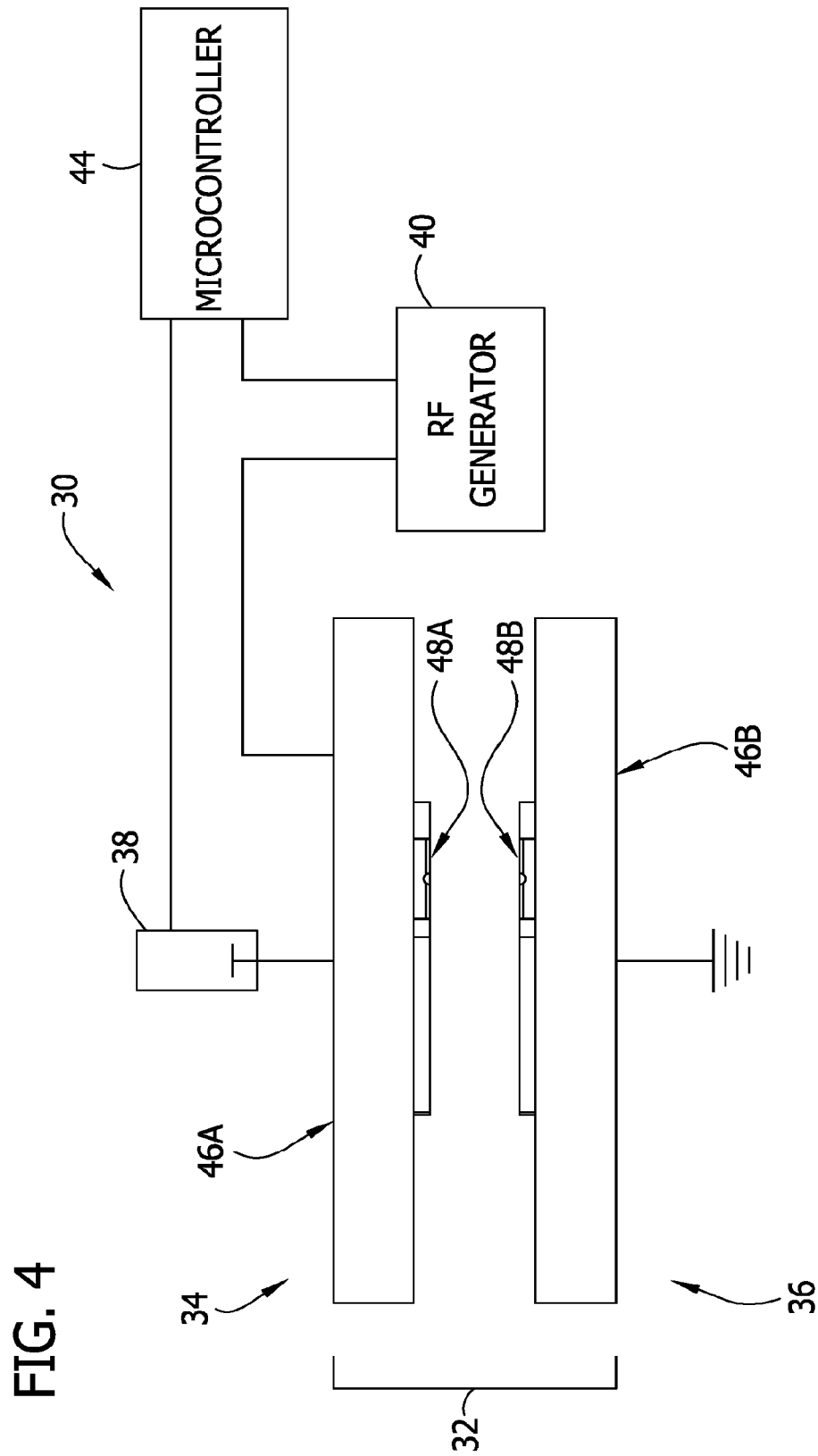
FIG. 4 is a schematic elevation of one embodiment of a welding apparatus for manufacturing the bladder assembly of FIG. 1.

Referring to FIGS. 4-12, one embodiment of a welding apparatus for making the bladder assembly 10 is generally indicated at 30. Referring to FIG. 4, in general, the apparatus includes a die, generally indicated at 32, having an upper die member, generally indicated at 34, and a lower die member, generally indicated at 36. A press device 38 of the welding apparatus 30 presses the opposed sheets 20 and the tube 12 disposed between the sheets (broadly, a bladder subassembly) between the die members 34, 36. A radiofrequency generator 40 (broadly, a source of radiofrequency current) electrically connected to the die 32 creates a radiofrequency field between the die members 34, 36 that heats the sheets 20 and the tube 12 to weld the sheets into a bladder 16 and to weld the sheets to the tube. As used herein, the term "bladder subassembly" refers broadly to the sheets 20 and the tube 12 disposed between the sheets before the sheets and the tube have been welded. Other components may be included in the subassembly and some components may be already connected together within the scope of the present invention. The bladder subassembly is generally indicated at 42 in FIG. 10. The welding apparatus 30 also includes a microcontroller 44 for integrating control of the press device 38 and the source of radiofrequency generator 40.

As shown best in FIGS. 4A-6, each die member 34, 36 comprises a perimeter-welding portion, generally indicated at 46A and 46B, respectively, for welding the sheets 20 together to define the perimeter of the bladder 16 and a tube-welding portion, generally indicated at 48A and 48B, for welding the sheets around the tube 12. Because each die member 34, 36 includes one perimeter-welding portion 46A, 46B and one tube-welding portion 48A, 48B and because the bladder assembly 10 has more than one bladder 16 (i.e., three bladders), more than one operation must be performed to make the separate bladders of the bladder assembly. For example, there may be three separate welding apparatuses along a conveyor for welding the three separate bladders 16. It is understood that the welding apparatus 30 may be configured to weld any number of bladders of a single bladder assembly during the same operation. For example, the welding apparatus 30 may include more than one die for forming more than one bladder of the bladder assembly simultaneously. Alternatively, the welding apparatus may include a single die that has multiple (e.g., three) perimeter-welding portions and multiple (e.g., three) tube-welding portions. For clarity and for purposes of this discussion, the illustrated welding apparatus 30 has only one pair of perimeter-welding portions 46A, 46B and one pair of tube-welding portions 48A, 48B for forming one bladder 16 of the bladder assembly 10 per operation.

Figure 5:
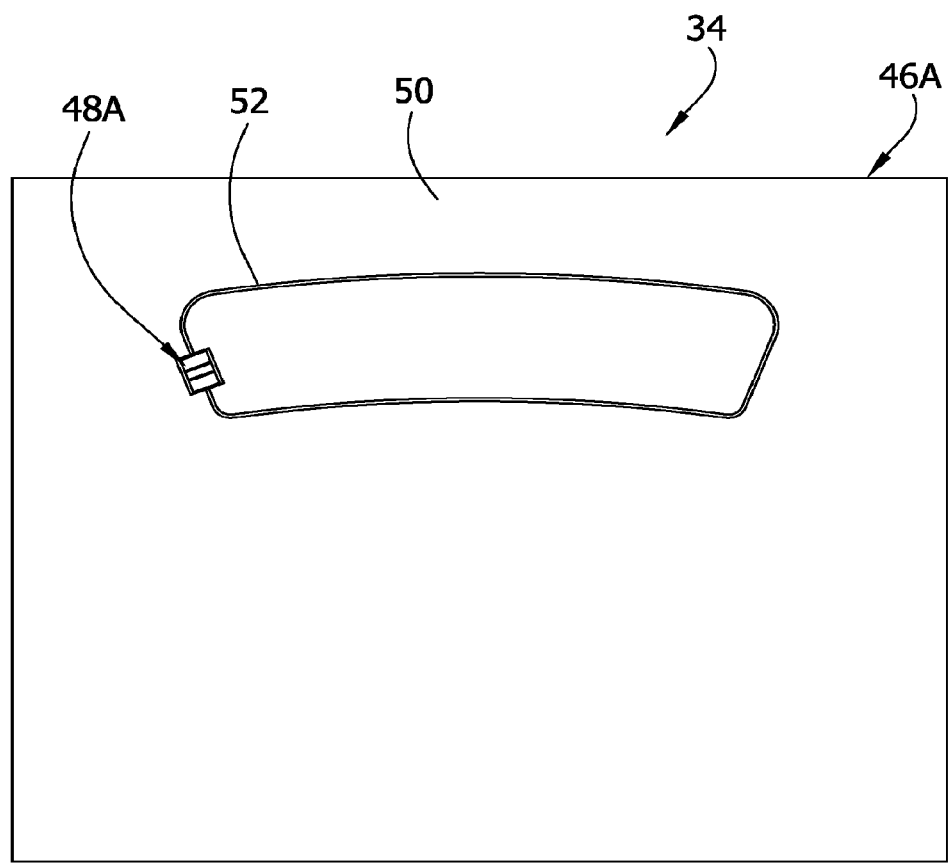
FIG. 5 is a plan view of an upper die member of the welding apparatus.
Figure 6:
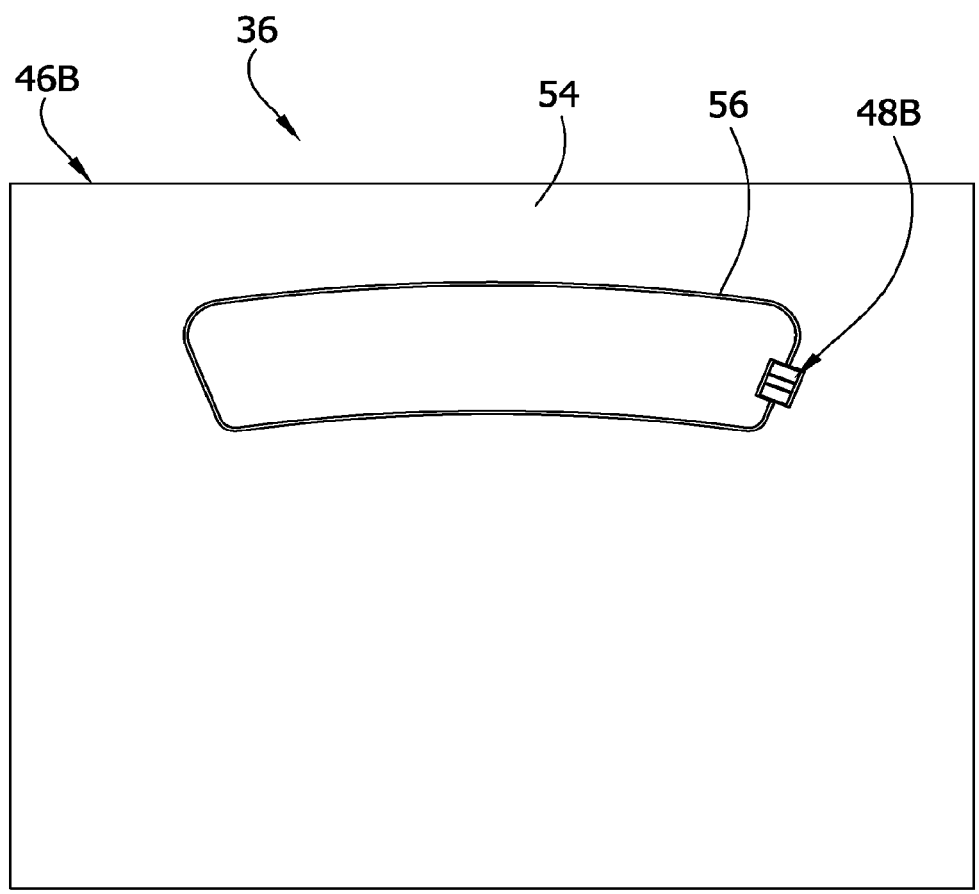
FIG. 6 is a plan view of the lower die member of FIG. 4.

The perimeter-welding portion 46A of the upper die member 34 includes an upper perimeter-welding block 50 and an upper perimeter-welding electrode 52 protruding downward from the upper block (FIGS. 4 and 5). The radiofrequency generator 40 is electrically connected to the electrode 52 via the upper perimeter-welding block 50. The electrode 52 is elongate and has a shape or outline corresponding generally to the shape of the perimeter of the bladder 16, except that the electrode is not continuous. That is, the electrode 52 has spaced apart ends. The perimeter-welding portion 46B of the lower die member 36 includes a lower perimeter-welding block 54 and a lower perimeter-welding electrode 56 protruding upward from the lower block (FIGS. 4, 4A and 6). The lower perimeter-welding block 54 is electrically grounded. The shape of the electrode 56 is a mirror image of the upper perimeter-welding electrode 52. The electrodes 52, 56 may be of other constructions. For example, either the upper or the lower perimeter-welding electrode 52, 56, respectively, may comprise a nest for receiving the other electrode, or either the upper or the lower perimeter-welding electrode may be a planar surface. Other configurations are within the scope of this invention. The perimeter-welding blocks 50, 54 and electrodes 52, 56 may be formed from any electrically conductive material. For example, the electrodes 52, 56 may be constructed of brass or copper or aluminum or stainless steel or magnesium and/or may be copper-plated or brass-plated.

Figure 7:
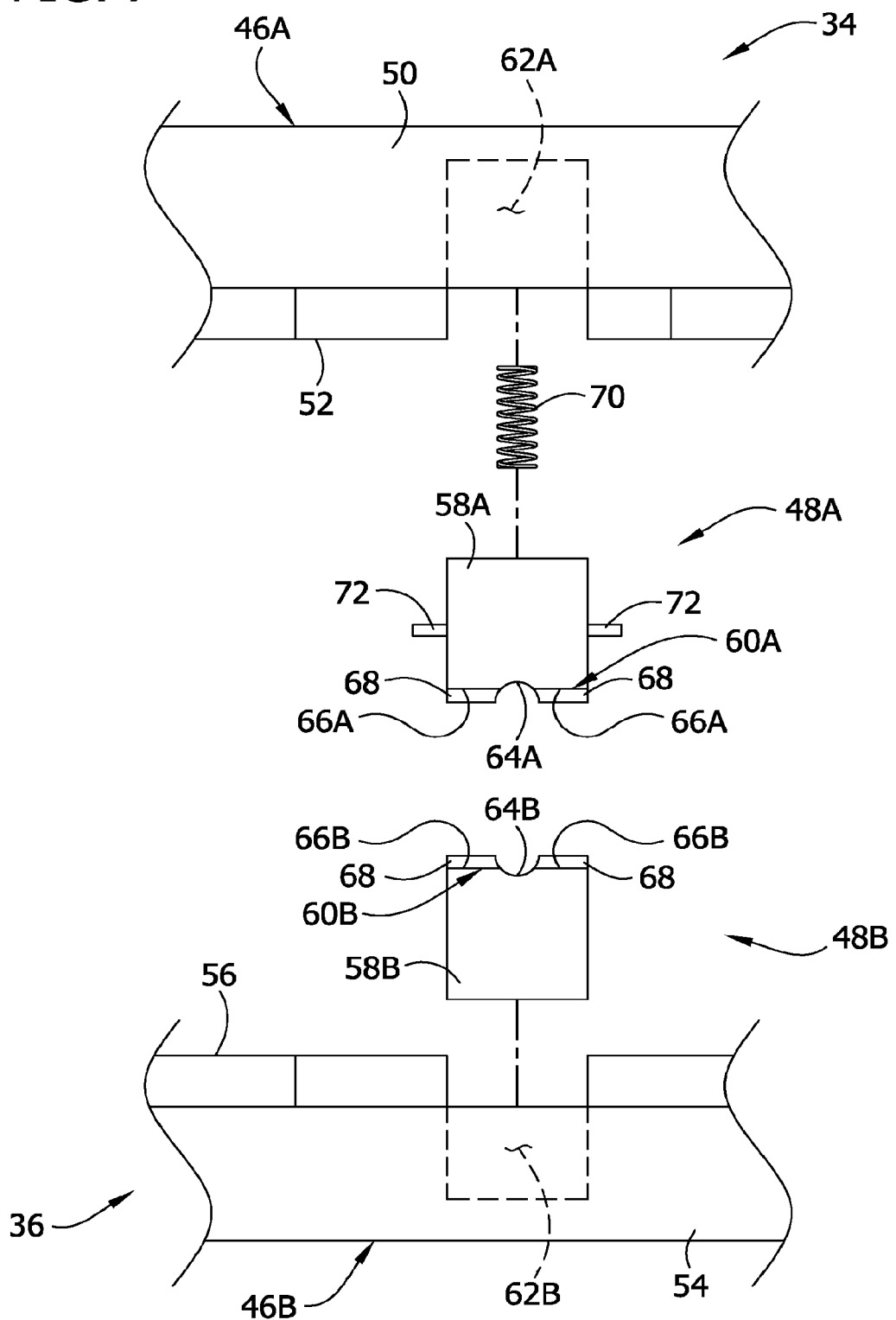
FIG. 7 is an enlarged, fragmentary front elevation of the upper and lower die members with tube-welding portions and a retaining device exploded therefrom.

As best seen in FIGS. 5-7, each of the tube-welding portions 48A, 48B of the upper and lower die members 34, 36, respectively, includes a tube-welding block 58A, 58B, respectively, and a tube-welding electrode, generally indicated at 60A, 60B, respectively, on the tube-welding block. The tube-welding blocks 58A, 58B are disposed within recesses 62A, 62B (FIG. 7) of the respective perimeter-welding blocks 50, 54 so that tube-welding electrodes 60A, 60B are disposed between the opposite ends of the respective perimeter-welding electrodes 52, 56. The tube-welding blocks 58A, 58B and electrodes 60A, 60B are electrically connected to the respective bladder-welding blocks 50, 54 and electrodes 52, 56, so that the upper tube-welding block is electrically connected to the radiofrequency generator 40 and the lower tube-welding block is electrically grounded. It will be appreciated that the electrical connection can be reversed within the scope of the present invention.

Figure 8:
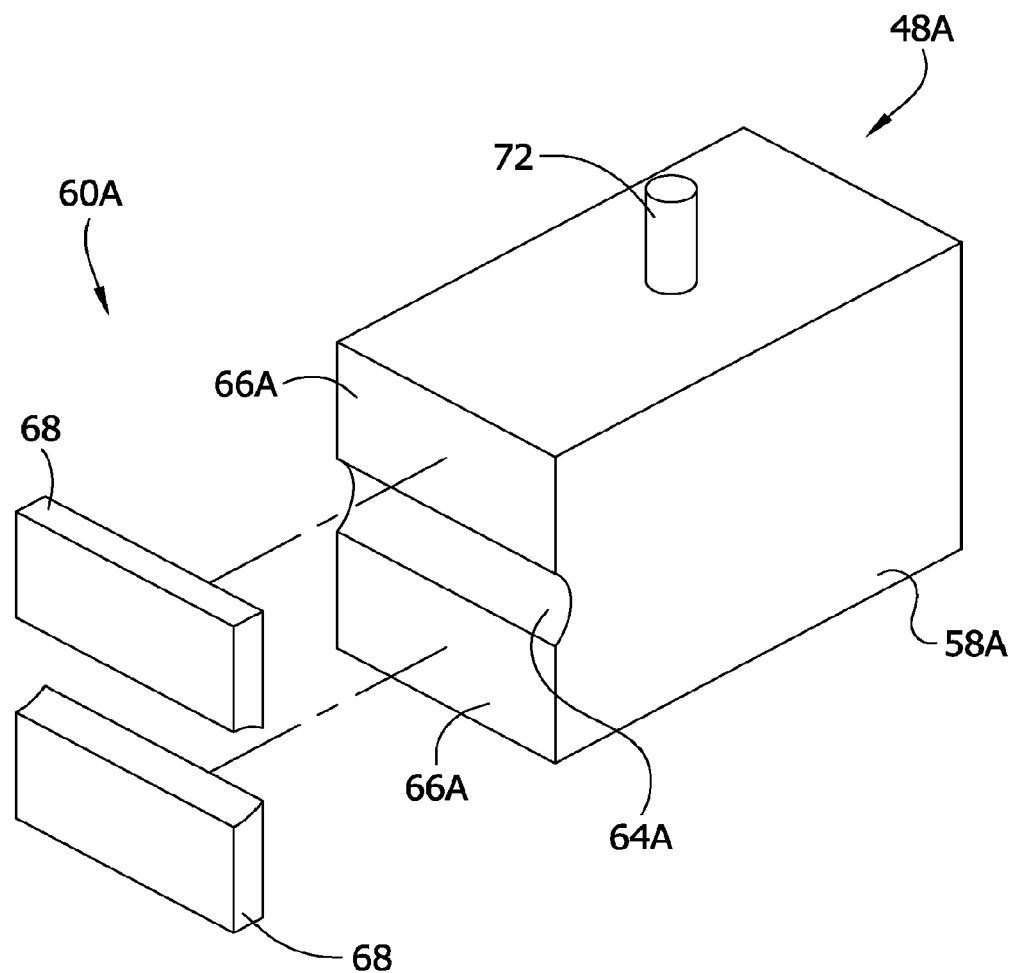
FIG. 8 is a perspective of the tube-welding portion of the upper die member.

Referring to FIGS. 7 and 8, each tube-welding electrode 60A, 60B includes a concave, arcuate surface 64A, 64B, respectively, and opposite, planar lateral surfaces 66A, 66B, respectively. The concave, arcuate surfaces 60A, 60B are sized and shaped to substantially completely surround the axial portion of the tube 12 to be welded in the bladder assembly 10 when the bladder subassembly 42 is pressed between the die members 34, 36. The radiofrequency electric field applied between these concave surfaces 64A, 64B forms the circumferential-weld area 26 of the tube-weld 24 (see FIG. 3). The concave, arcuate surfaces 64A, 64B generally have depths and widths slightly greater than the radius of the tube 12 to accommodate the thicknesses of the sheets overlying and underlying the tube. Likewise, the radiofrequency field applied between the lateral surfaces 66A, 66B of the electrodes 60A, 60B forms the lateral-weld areas 28 of the tube-weld 24. The tube-welding blocks 58A, 58B and electrodes 60A, 60B may have other shapes and may be formed from any electrically conductive material. For example, the electrodes 60A, 60B may be constructed of brass or copper or aluminum or stainless steel or magnesium and/or may be copper-plated or brass-plated.

As shown throughout the drawings, dielectric elements 68 are attached to the lateral surfaces 66A, 66B of the electrodes 60A, 60B. The dielectric elements 68 contact the sheets 20 and allow for the radiofrequency electric field produced between the lateral surfaces 66A, 66B of the electrodes 60A, 60B to be evenly distributed along the electrodes and prevent arcing between the electrodes. The tube electrodes 60A, 60B are tuned using the dielectric material 68 so that the circumferential-weld area 26 is formed more nearly at the same rate as the lateral weld areas 28 of the tube-weld 24. Otherwise, without tuning the electrodes 60A, 60B, the lateral-weld areas 28 would heat more quickly than the circumferential weld area 26, thereby leading to thinning and weakening of the sheets 20 at the lateral-weld areas and/or an incomplete weld at the circumferential-weld area.

Figure 8A:
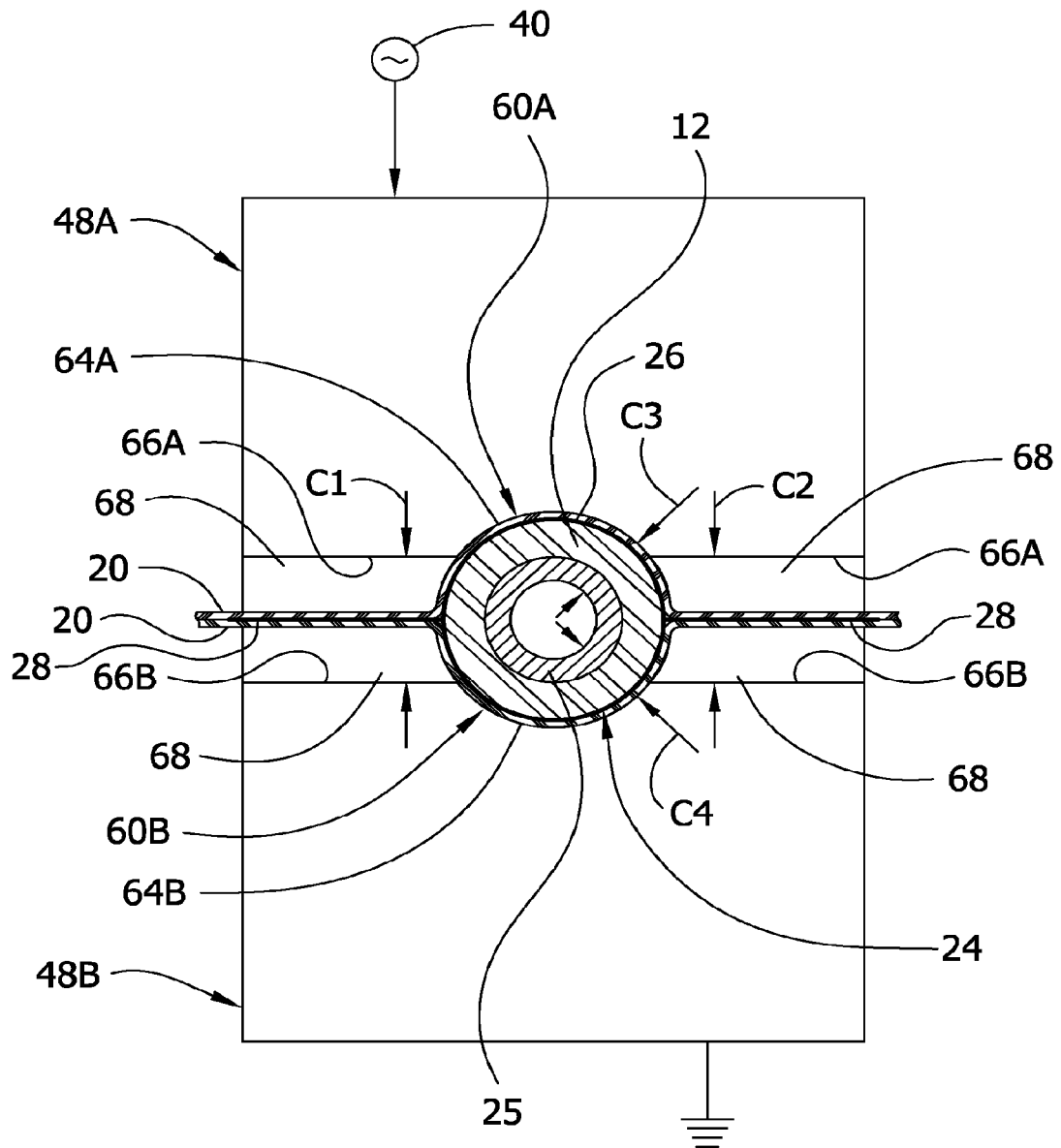
FIG. 8A is a front elevation of the tube-welding portions forming a tube-weld of the bladder assembly, electrical flow of radiofrequency energy from a radiofrequency generator being shown schematically.
Figure 8B:
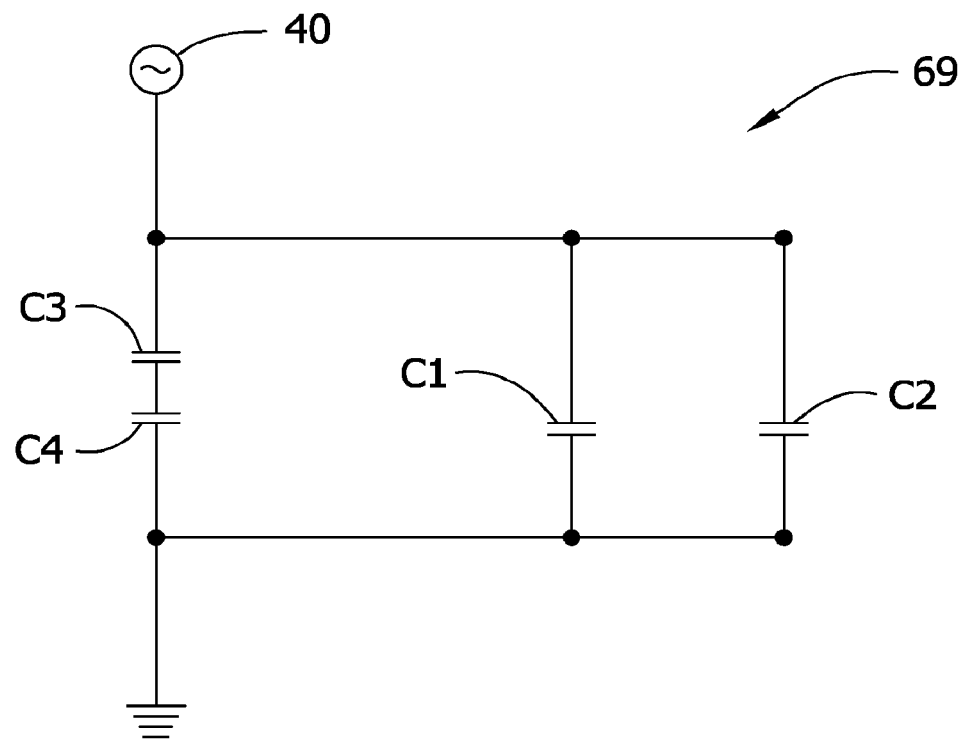
FIG. 8B is an electrical schematic representing components of the tube-welding portions as electrical components.

Referring to FIG. 8A, during operation the radiofrequency generator 40 delivers radiofrequency energy to the upper tube welding portion 48A. The radiofrequency energy flows from the upper tube-welding portion 48A through the opposing sheets 20 and the tube 12 to the lower tube-welding portion 48B. This flow of radiofrequency energy can be modeled by an electrical circuit, generally designated by reference numeral 69 in FIG. 8B. Opposite lateral surfaces 66A, 66B and dielectric material 68 of the upper and lower tube-welding electrodes 60A, 60B can be modeled by capacitors C1 and C2. The arcuate surface 64A of the upper tube-welding electrode 60A and an upper portion of the tubular insert 25 can be modeled by a capacitor C3. The arcuate surface 64B of the lower tube-welding electrode 60B and a lower portion of the tubular insert 25 can be modeled by a capacitor C4. In the electrical circuit 69, the capacitors C1 and C2 are connected in parallel to each other and to the capacitors C3 and C4, which are connected in series to each other, as illustrated in FIG. 8B. Generally, the following relationship for capacitance of the capacitors C1-C4 should be achieved for uniform welding of the tube-weld 24: $(1/C3)+(1/C4)=(1/C1)=(1/C2)$. In other words, the dielectric material 68 between the lateral surfaces 66A, 66B must be adjusted to allow relatively more radiofrequency energy to be directed to the capacitors C3 and C4 (i.e., to the circumferential weld 26). The tube 12 requires thicker dielectric elements 68 between the lateral surfaces 66A, 66B (capacitors C1 and C2) to produce a satisfactory tube-weld 24. The thickness and dielectric constant of the dielectric elements 68 are such that the circumferential-weld area 26 is formed at substantially the same rate as the lateral weld areas 28 of the tube-weld 24. Determination of the proper thickness and dielectric constant of the dielectric elements 68 to ensure proper welding is generally referred to in the application as tuning.

Figure 9:
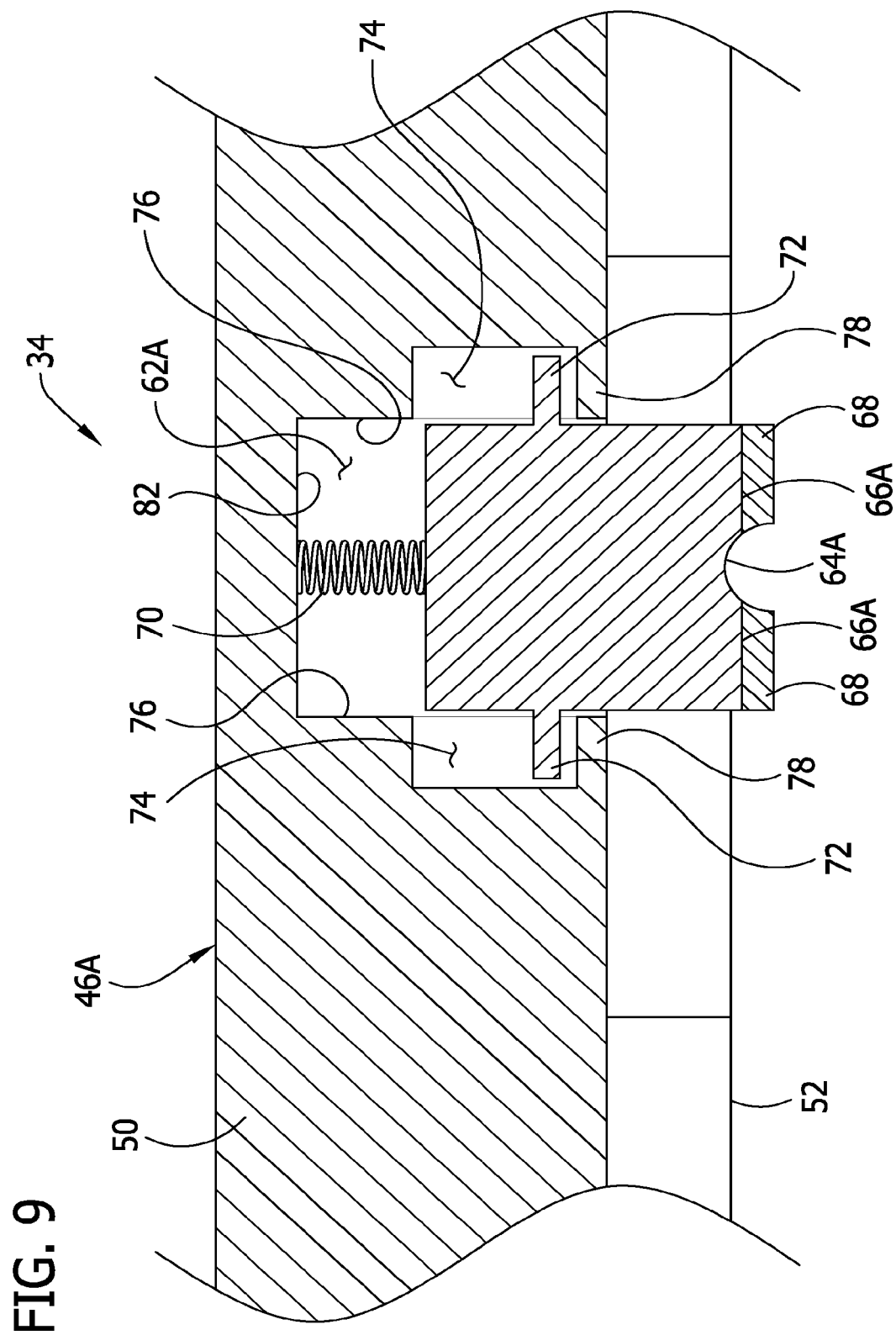
FIG. 9 is an enlarged, fragmentary section of the upper die member.

Referring to FIGS. 7-9, the welding apparatus 30 includes a retaining device 70 for pressing the tube-welding portion 48A of the upper die member 34 against the bladder subassembly 42 independent of the perimeter-welding portion 46A of the upper die member. More specifically, the welding apparatus 30 is configured to lift the perimeter-welding portion 46A of the upper die member 34 while the retaining device 70 continues to press the tube-welding portion 48A of the die member against the sheets 20 and the tube 12. Opposite tabs 72 project laterally outward from sides of the upper tube-welding block 58A. As best seen in FIG. 9, the tabs 72 are received in slots 74 formed in side walls defining the upper recess 62A to allow the upper tube-welding portion 48A to slide within the recess relative to the upper perimeter-welding portion 46A. The slots 74 end short of a bottom surface of the upper perimeter-welding block 50 to provide stops for the tabs 72 so that the tube-welding portion 48A remains within the recess 62A. The retaining device comprises a spring 70 within the recess 62A is positioned between a top surface of the tube-welding portion 48A and an upper wall 82 defining the recess. The spring 70 exerts a downward force on the tube-welding portion 48A so that the tube-welding portion maintains its position relative to the subassembly 42 and continues to press the subassembly as the upper perimeter-welding portion 46A of the upper die member 34 is lifted a short distance away from the bladder subassembly. It is understood that another retaining device may be associated with the lower tube-welding portion. Other ways of pressing the tube-welding portion 48A independent of the perimeter-welding portion 46A is within the scope of this invention. For example, a cylinder, such as an air cylinder, may be used in lieu of the spring 70.

Figure 10:
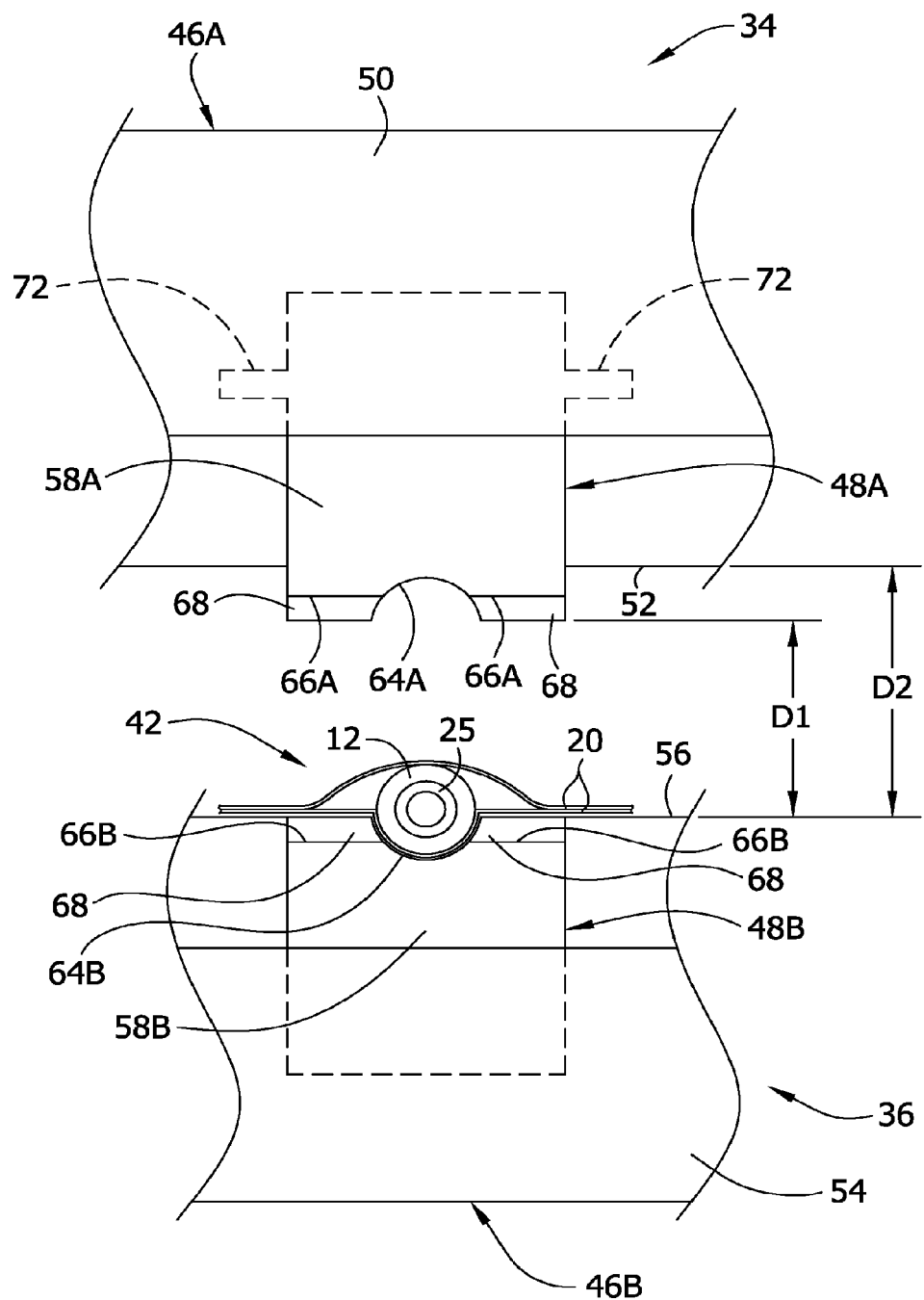
FIG. 10 is an enlarged, fragmentary section of the upper and lower die members with the upper die member in an initial configuration and a bladder subassembly disposed between the upper and lower die members.
Figure 11:
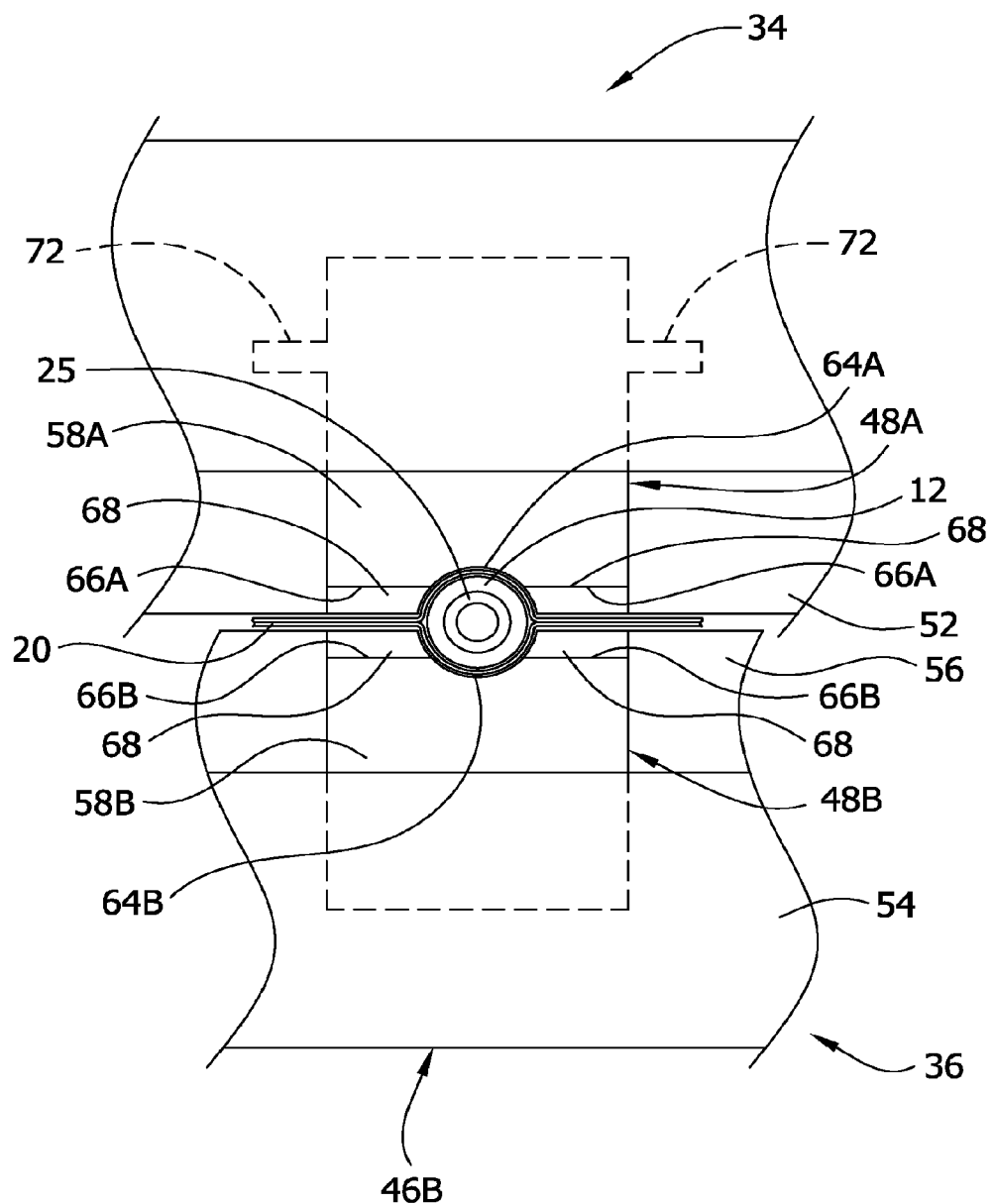
FIG. 11 is similar to FIG. 10 with the upper die member being in a primary welding configuration, in which a perimeter-weld and a tube-weld are being formed on the bladder assembly.
Figure 12:
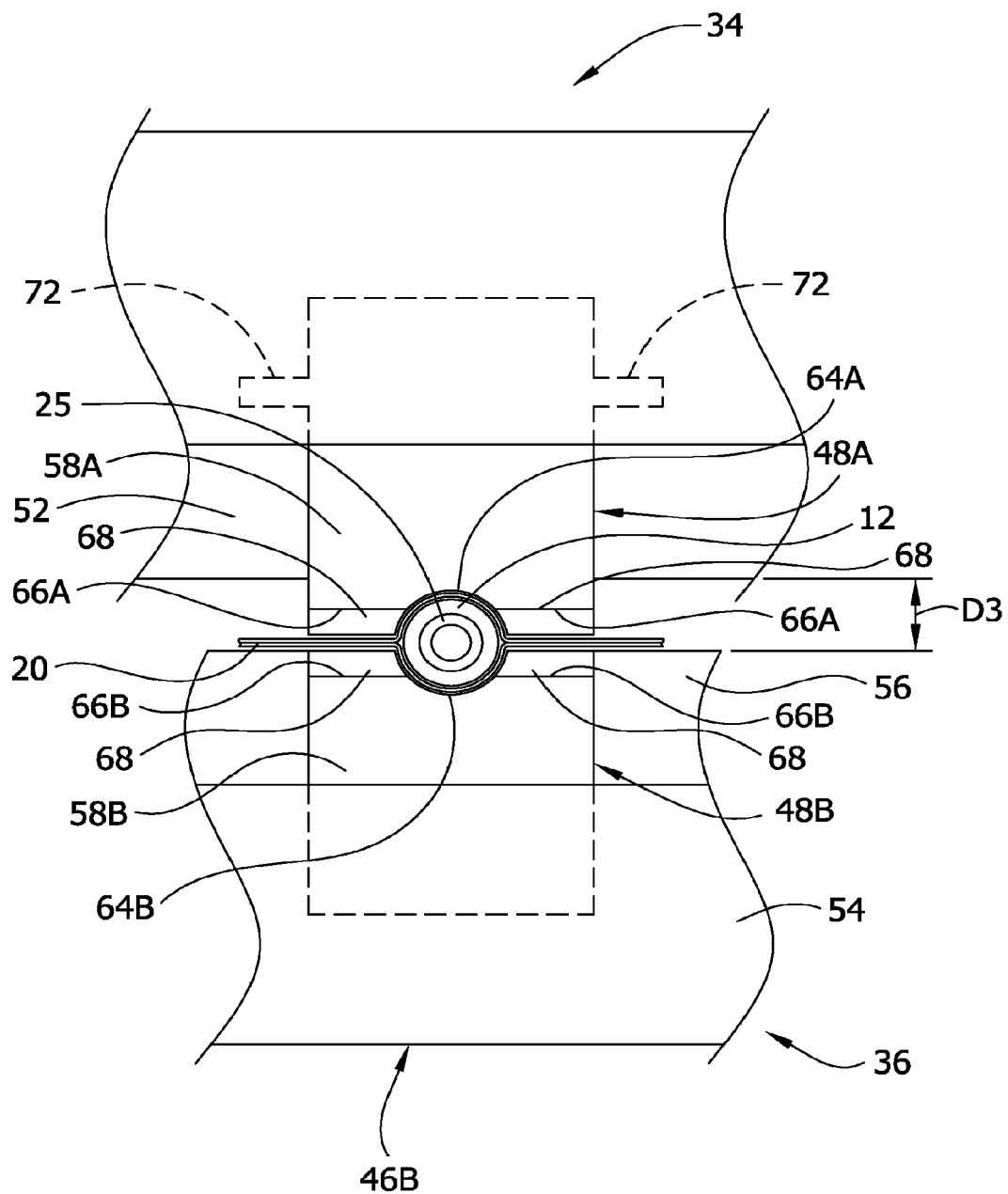
FIG. 12 is similar to FIG. 11 with the upper die member being in a secondary welding configuration, in which the perimeter-weld is complete and the tube-weld is continuing to be formed.

Referring now to FIGS. 10-12, an exemplary process of forming the bladder assembly 10 is illustrated. The tubular insert 25 is inserted in the polymeric tube 12. The tubular insert 25 may be formed from a non-ferrous metal, such as brass or copper or aluminum or stainless steel, or may be formed from other material. The tubular insert 25 is sized and shaped to fit snugly within the axial portion of the tube 12 that is to be welded to sheets 20. Thus, the tubular insert 25 may have a length that is substantially the same as the length of the arcuate tube-welding surfaces 64A, 64B of the tube-welding electrodes 60A, 60B of the die members 34, 36. It is understood that the insert 25 may be other sizes; for example, it may extend the full length of the tube 12.

The tube 12 with the tubular insert 25 is placed between the sheets 20 to form the bladder subassembly 42. Using the press device, the upper die member 34 is positioned in an initial position (FIG. 10), whereby the upper tube-welding electrode 60A is spaced from the lower tube-welding electrode 60B a distance D1 and the upper perimeter-welding electrode 52 is spaced from the lower perimeter-welding electrode 56 a distance D2. The spring 70 forces the upper tube-welding portion 48A downward so that the upper tube-welding electrode 60A extends past the upper perimeter-welding electrode 52. It is understood that the retaining device may include a retractable stop (not shown) or other device that keeps the upper tube-welding portion 48A in a position in which the upper tube-welding electrode 60A is generally aligned horizontally with the upper perimeter-welding electrode 52 when the upper die member 34 is in the initial position. The distances D1, D2 should be such that the bladder subassembly 42 can be placed between the die members 34, 36.

The bladder subassembly 42 is then placed on the lower die member 36. It is understood that the bladder subassembly 42 may be preassembled and then placed between the die members 34, 36, as described above, or may be assembled between the die members. After the bladder subassembly 42 is placed between the die members 34, 36, the press device 38 is activated to lower the upper die member 34 to a primary-welding configuration (FIG. 11), whereby both the tube-welding electrodes 60A, 60B and the perimeter-welding electrodes 52, 56 are compressing the bladder subassembly. Radiofrequency current from the generator 40 is supplied to both the perimeter-welding portions 46A and the tube-welding portion 48A of the upper die member 34. The radiofrequency current creates an electric field modulated in the radiofrequency range (broadly, radiofrequency energy) between the tube-welding electrodes 60A, 60B and between the perimeter-welding electrodes 52, 56. As is well-known in the art, the radiofrequency field heats the polymeric sheets 20 and the tube 12 disposed between the electrodes 60A, 60B and 52, 56.

After a first amount of time, during which the perimeter-weld 22 of the bladder 16 has been formed by the perimeter-welding electrodes 52, 56, the press device 38 lifts the upper die member 34 to a secondary-welding configuration (FIG. 12). In this configuration, the upper perimeter-welding electrode 52 is spaced a distance D3 from the lower perimeter-welding electrode 56. By virtue of the spring 70, the tube-welding electrodes 60A, 60B continue to compress the bladder subassembly 42 and the radiofrequency field is still present between the tube-welding electrodes. That is, the spring 70 maintains the upper tube-welding electrode 60A in contact with the subassembly 42 as the upper perimeter-welding portion 46A moves upward. If the retaining device has a stop mechanism, as mentioned above, the stop mechanism will be disengaged to allow the spring 70 to retain the position of the upper tube-welding portion 48A relative to the subassembly 42. The distance D3 may be between about 0.1 in and about 0.5 in. This distance is sufficient to weaken the radiofrequency field enough so that the bladder subassembly 42 between the perimeter-welding electrodes 52, 56 is not being significantly heated. It is understood that the distance may be dependent on the strength of the radiofrequency electric field.

When the upper die member 34 is in the secondary-welding configuration, a majority of the radiofrequency current from the generator 40 is directed solely to the tube-welding electrode 60A. This creates a relatively stronger radiofrequency field between the tube-welding electrodes 60A, 60B than was present in the primary-welding configuration. The output of the radiofrequency generator 40 may be decreased to lessen the strength of the radiofrequency energy between the tube-welding electrodes 60A, 60B to control the rate of heating. Otherwise, the sheets 20 and the tube 12 may burn or thin out substantially, thereby weakening the tube-weld 24.

Figure 13:
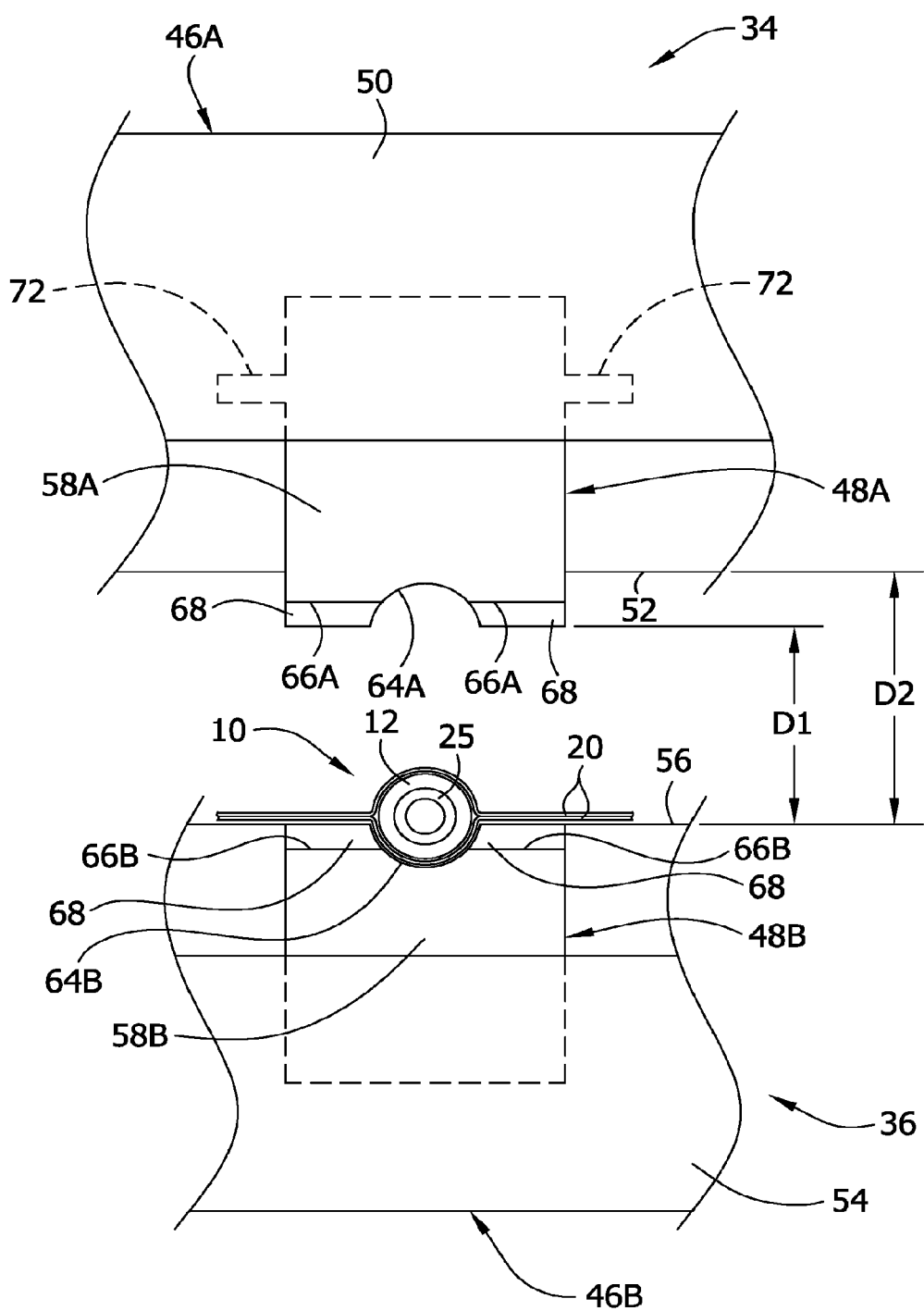
FIG. 13 is similar to FIG. 11 with the upper die member in its initial position after both the perimeter-weld and the tube-weld are complete.
Figure 14:
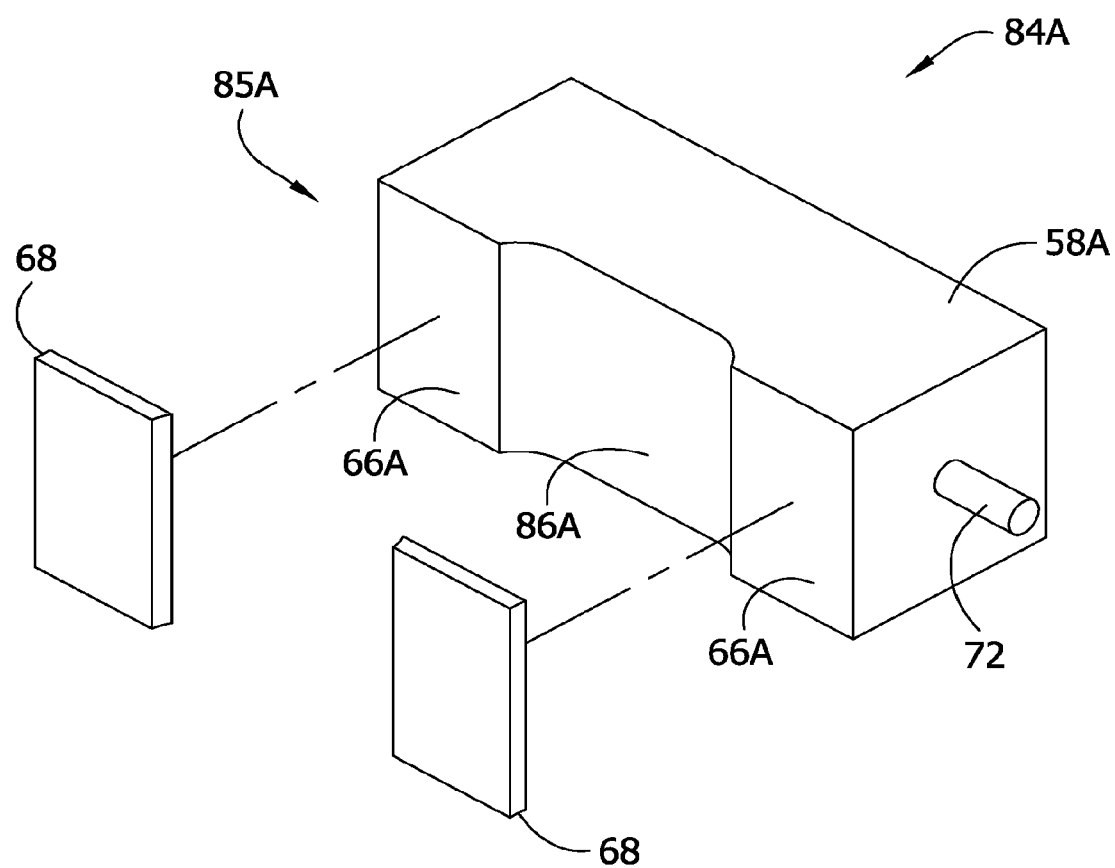
FIG. 14 is a perspective of another embodiment of a tube-welding portion of the welding apparatus, with dielectric elements exploded therefrom.
Figure 15:
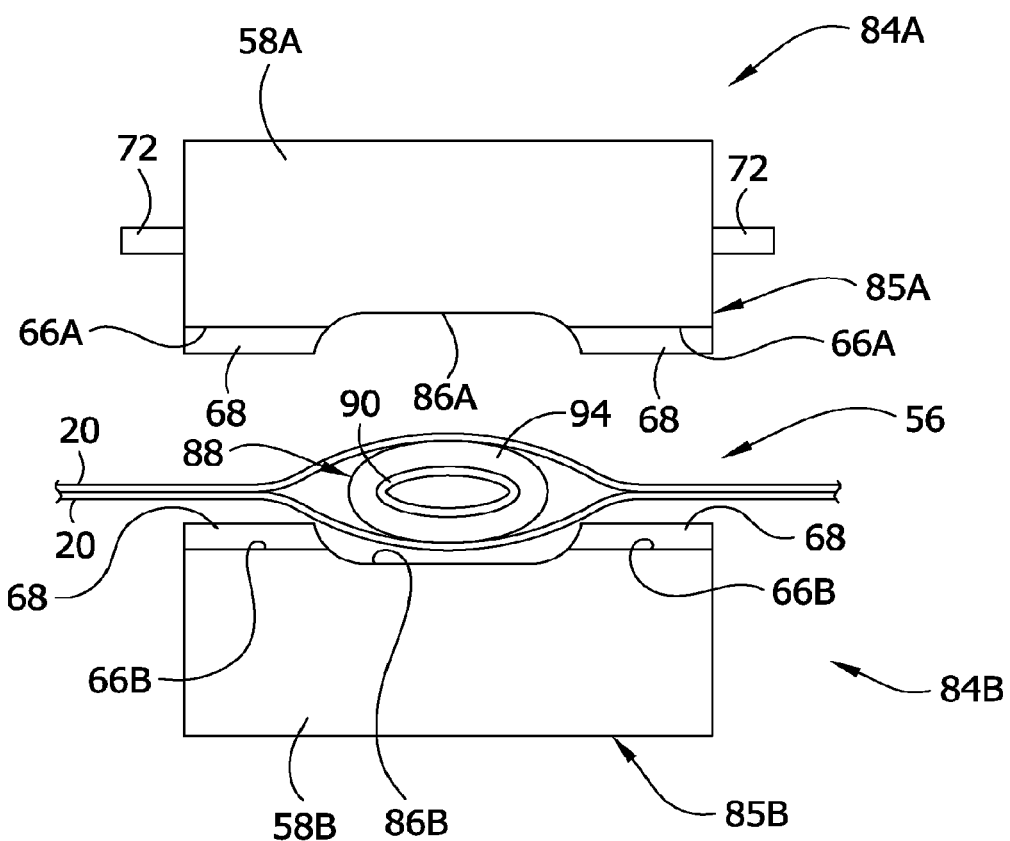
FIG. 15 is a front elevation of the tube-welding portions when the upper die member is in the initial configuration and the bladder subassembly is disposed between the upper and lower die members.

After a second amount of time, during which the tube 12 is welded to the sheets 20, the press device 38 lifts the upper die member 34 back to its initial configuration (FIG. 13) so that the upper tube-welding electrode 60A and the upper perimeter-welding electrode 52 are not in contact with the formed bladder assembly 10. At this point, the assemblage of the bladder assembly 10 is substantially complete, whereby the bladder 16 is formed and the tube 12 is welded in fluid communication with the bladder.

It is understood that substantially an entirety of the welding process may be automated using the microcontroller 44. For example, the microcontroller 44 may be programmed to automatically configure the upper die member 34 in its initial position using the press device 38; lower the upper die member to its primary welding configuration for a predetermined or preprogrammed first amount of time; raise the upper die member to its secondary welding configuration for a preprogrammed second amount of time; adjust the output of the radiofrequency generator 40 as described above; and raise the upper die member back to its initial configuration. Other ways of automating the welding apparatus are within the scope of this invention.

Referring to FIGS. 14-17, in another embodiment, the welding apparatus 30 may include upper and lower tube-welding portions, generally indicated at 84A, 84B, respectively, having electrodes 85A, 85B with low profile arcuate surfaces 86A, 86B, respectively, for welding a tube assembly 88 with a resiliently deformable tubular insert 90 to the sheets 20. With the exception of the tube assembly 88, the remainder of the bladder assembly 56 may be the same as the first embodiment. Components of the tube-welding portions 84A, 84B that are similar to the previous embodiment are indicated by the same reference numerals as in the previous embodiment. Only the tube-welding portions 84A, 84B of the welding apparatus 30 are illustrated in FIGS. 14-17 for purposes of clarity. It is understood that the tube-welding portions 84A, 84B replace the previous tube-welding portions 48A, 48B in the welding apparatus 30. It is also understood that alternatively, the tube-welding portions 84A, 84B may be used in other welding apparatus.

Figure 17:
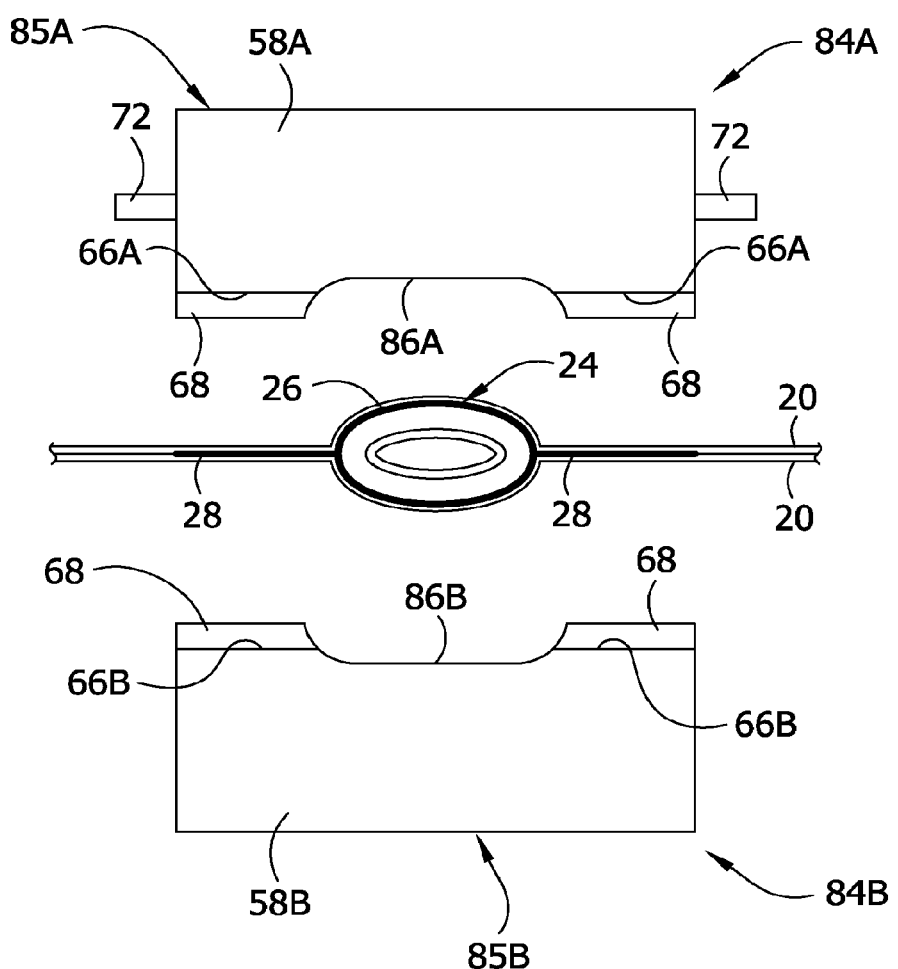
FIG. 17 is similar to FIG. 16 with the tube-weld being completed and the tube-welding portions no longer compressing the tube assembly.
Figure 18:
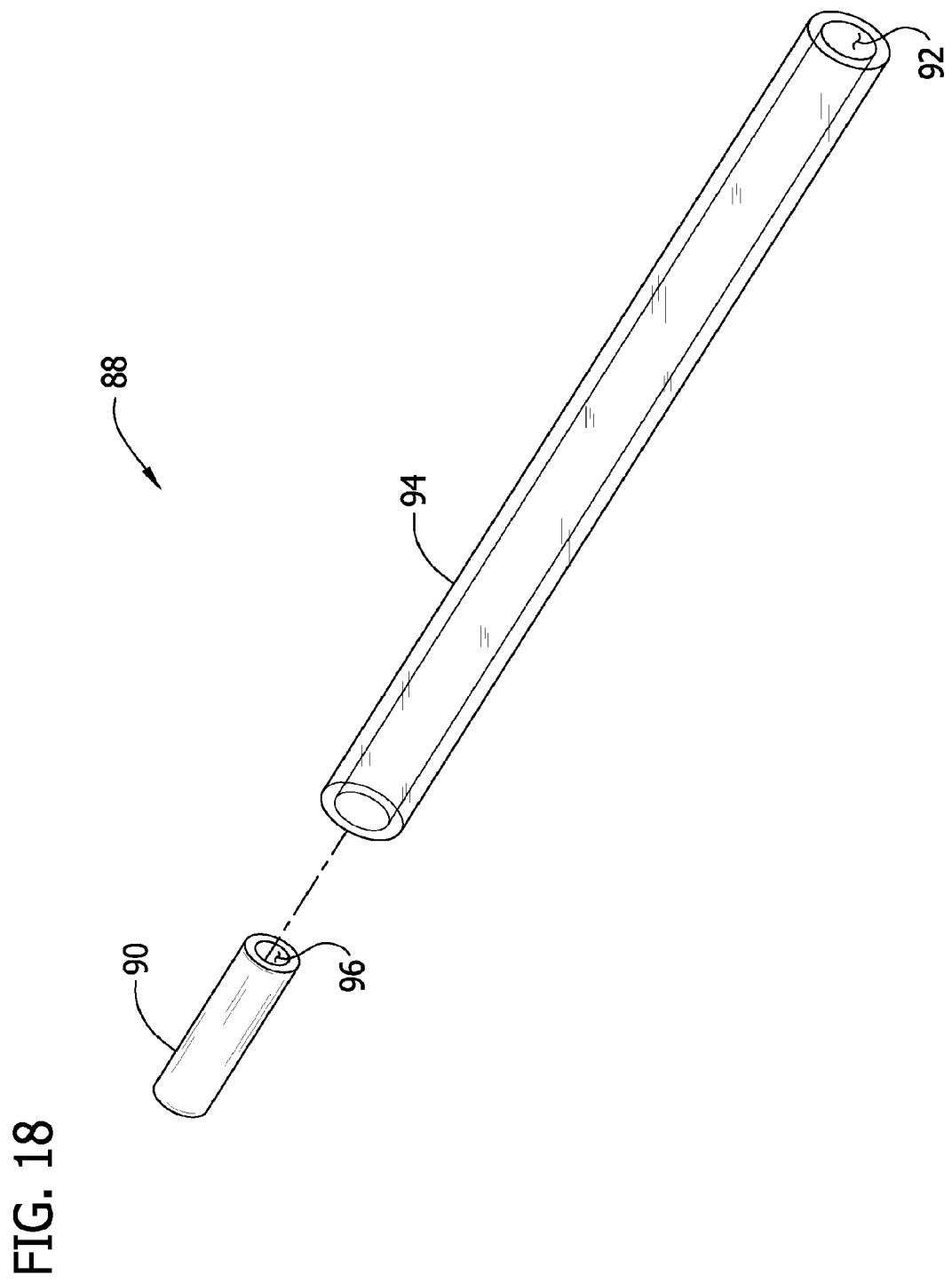
FIG. 18 is a perspective of the tube assembly with a tubular insert exploded from a tube of the tube assembly.
Figure 19:
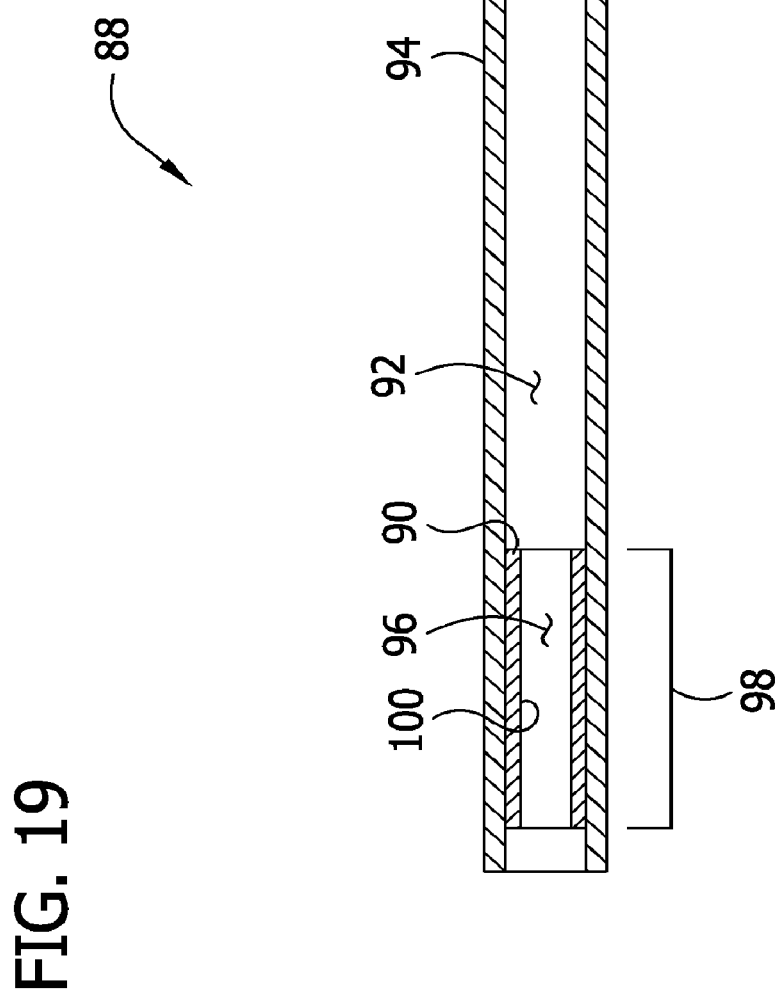
FIG. 19 is a longitudinal section of the tube assembly.
Figure 20:
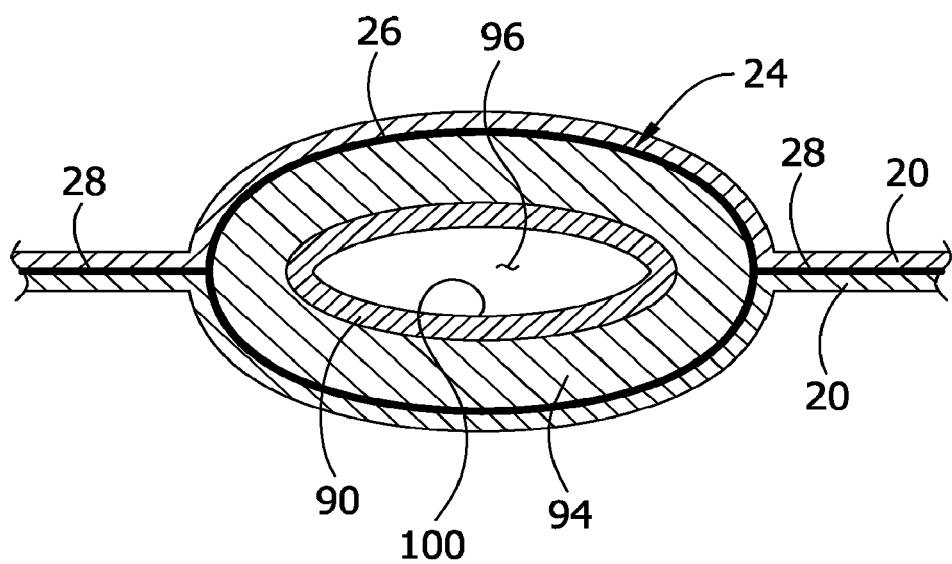
FIG. 20 is an enlarged, fragmentary section of the bladder assembly similar to FIG. 3 but with the tube assembly of FIG. 18 being secured to the assembly.

Referring to FIGS. 18 and 19, the resiliently deformable tubular insert 90 is received in a lumen 92 of a tube 94 of the tube assembly 88. As used herein, the term "tube assembly" refers to the tube 94 with the tubular insert 90. The tubular insert 90 defines an insert lumen 96 which is generally concentric with the respective tube lumen 92. The tubular insert 90 is sized and shaped to extend generally only along an axial portion 98 of the tube 94, although the tubular insert may extend along the entire axial length of the respective tube. The tubular insert 90 may be secured by a friction-fit in the respective tube lumen 92 or may be adhered within the tube lumen. The shape of the tubular insert 90 defines the shape of the axial portion 98 of the tube 94. Referring to FIGS. 17-20, in the illustrated embodiment, the tubular insert 90, and therefore the axial portion 98 of the tube 94, has a generally elliptical cross-section, with a major axis generally parallel to a plane containing surfaces of the bladder assembly 10 and a minor axis extending generally orthogonally to the plane. This elliptical shape gives the tube 94 a generally low profile where it is welded in the bladder assembly 10.

For purposes explained below, the tubular insert 90 is generally not heated to the point of melting when placed in the radiofrequency alternating electric field. Accordingly, the tubular insert 90 may be insusceptible to heating in a radiofrequency electric field and/or may have a higher melting temperature than that of the tube 94. For example, the tubular insert 90 may be formed from polyethylene, polypropylene or PTFE, all of which are insusceptible to heating in the radiofrequency field. Alternatively, an inner surface 100 the tubular insert 90 defining the insert lumen 96 may be insusceptible to heating in a radiofrequency electric field and/or may have a higher melting temperature than that of the tube 94. In one example, the tubular insert 90 may be formed from material that may be welded by high frequency energy (i.e., material that is susceptible to heating in a high frequency electric field), and the inner surface 100 of the insert may be coated or adhered to a material insusceptible to heating in a radiofrequency electric field.

Figure 16:
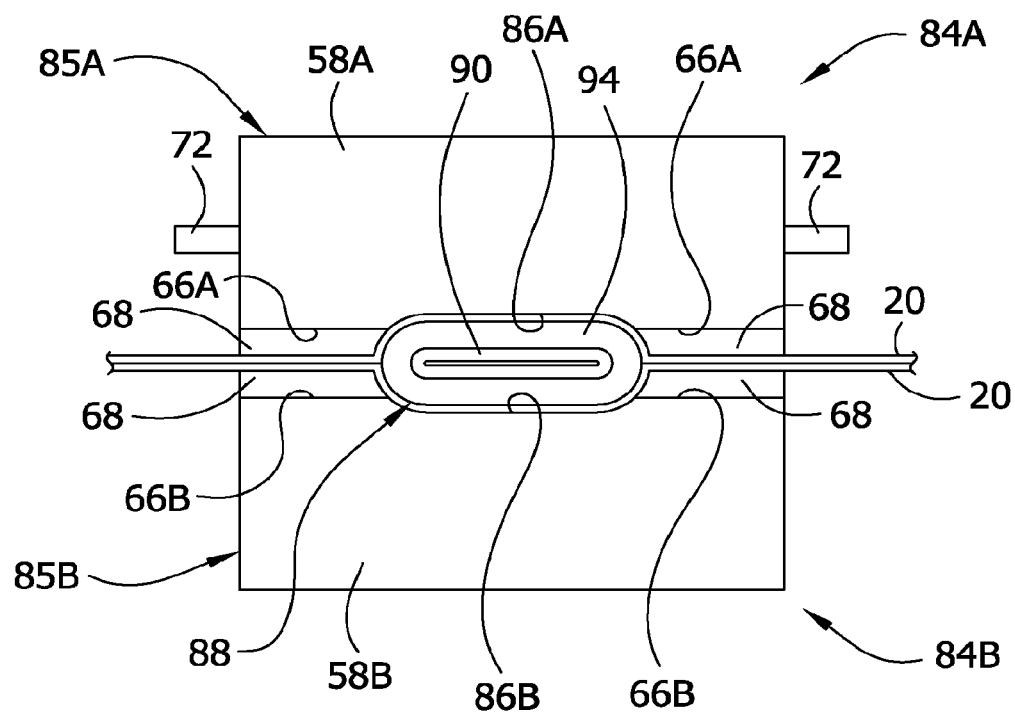
FIG. 16 is similar to FIG. 15 with the upper die member being in a primary welding configuration, in which the tube-welding portions are compressing the tube assembly.

Referring again to FIGS. 15-17, during the welding process, and more specifically, when the upper die member 34 is in the primary-welding configuration, the tube 94, the tubular insert 90 and the sheets 20 surrounding the tube flatten as the upper die member compresses the bladder assembly 56, which reduces thickness variations of the bladder subassembly 56 in the region of the tube assembly 88. During compression the tube 94 and the tubular insert 90 are in a generally flattened state and a width of the tube extends substantially along the entire length of the arcuate surfaces 86A, 86B of the electrodes 85A, 85B, as shown in FIG. 16. As the die members 34, 36 compress the sheets between the flattened tube and tubular insert, the radiofrequency alternating electric field welds the tube assembly 88 to the sheets 20. As explained above, the tubular insert 90 does not heat to the point of substantial melting in the presence of a radiofrequency electric field therefore, the inner surface 100 of the tubular insert is not welded together during the process. If the tubular insert 90, or at least the inner surface 100 of the tubular insert was susceptible to heating by high frequency energy, then the tubular insert may be welded closed during the process and preclude fluid communication between the tube 94 and the bladder 16.

Referring to FIG. 17, as the upper die member 34 is lifted away from the bladder subassembly 56, the tubular insert 90 expands or rebounds radially from its flattened configuration, thereby opening its lumen 96 and opening the tube lumen 92. In its final configuration, the tubular insert 90 will have a generally elliptical cross-section, as explained above and illustrated in FIGS. 17 and 20. It is understood that the tubular insert 90, before being welded may or may not have this generally elliptical cross-section but may take on this elliptical configuration in the completed bladder assembly 10. For example, the tubular insert 90 may originally have a generally circular cross-section.

In another embodiment (not shown), the present welding apparatus additionally includes stop members or stand-offs for limiting the penetration of the upper perimeter-welding electrode into the opposed sheets. The stop members may comprise columns positioned along a perimeter of the perimeter-welding portion of the lower die member. It is understood that the stop members may be of other shapes and a single or continuous stop may be used. The stop members may be integrally formed with either the lower die member or the upper die member or both die members.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of forming a bag assembly comprising a bag and a tube providing fluid communication with an interior of the bag, the method comprising:

forming a subassembly by positioning at least a portion of the tube between a pair of opposed sheets;

placing the subassembly between a first die member and a second die member opposing said first die member, the first and second die members each defining a single die;

pressing the subassembly with the first and second die members;

applying an electric field between the first and second die members in a first location for heating the pair of sheets along a path to weld the pair of sheets together to define a perimeter of the bag and in a second location for welding the tube to the pair of sheets; and moving a portion of one of the opposing first and second die members in the first location away from the other of the first and second die members in the first location to reduce the heating of the pair of sheets at the first location while maintaining a spacing between portions of the opposing first and second die members in the second location to continue welding at the second location.

2. A method of forming a bag assembly as set forth in claim 1 wherein the portions of the opposing first and second die members in the first location are both moved away from each other to reduce the heating of the pair of sheets at the first location.

3. A method of forming a bag assembly as set forth in claim 1 wherein said creating an electric field comprises supplying a single radiofrequency current to the first and second die members.

4. A method of forming a bag assembly as set forth in claim 3 further comprising decreasing without completely eliminating the electric field after said step of increasing the spacing.

5. A method of forming a bag assembly as set forth in claim 4 wherein said step of pressing the subassembly comprises using a press to force one of the first and second die members toward the other of said first and second die member.

6. A method of forming a bag assembly as set forth in claim 1 wherein the step of applying an electrical field includes simultaneously forming a perimeter-weld of the bag and a tube-weld between the pair of sheets and tube, the perimeter and tube welds defining a continuous weld on the bag assembly.

7. A method of forming a bag assembly as set forth in claim 1 wherein the tube includes a resiliently deformable insert, and wherein said step of pressing the subassembly comprises flattening the tube and the tubular insert.

8. A method of forming a bag assembly as set forth in claim 7 further comprising stopping the step of pressing the subassembly with the first and second die members, the tubular insert having a resiliency permitting reconfiguring the tubular insert and the tube to an open configuration.

9. A method of forming a bag assembly as set forth in claim 8 wherein the tubular insert when reconfigured to the open configuration has an elliptical cross section having a major axis disposed generally parallel to a plane of the pair of sheets.

10. A method of forming a bag assembly as set forth in claim 9 wherein the tubular insert is unaffected by the applied electric field.

11. A method of forming a bag assembly as set forth in claim 10 wherein the tubular insert is press-fitted in the tube.

12. A method of forming a bag assembly as set forth in claim 10 wherein the tubular insert is adhered to an inside of the tube.

13. An apparatus for forming a bag assembly including a bag formed from opposing sheets welded together along a perimeter-weld and a tube welded to the opposing sheets along a tube-weld for providing fluid communication with an interior of the bag, the apparatus comprising:

a die including a first die member and a second die member opposing the first die member, the first and second die members each defining a single die, the first die member and the second die member having opposing tube-welding portions for welding the opposing sheets to the tube, and opposing perimeter-welding portions for welding the opposing sheets together to define the bag, the first die member and second die member being disposed for relative movement toward one another to press the opposing sheets and tube and away from one another, the perimeter-welding portion of the first die member being movable relative to the tube-welding portion of the first die member when the first die member and the second die member press the opposing sheets and tube to permit an increase in spacing between the perimeter-welding portion of the first die member and the perimeter-welding portion of the second die member so that welding of the opposing sheets by the perimeter-welding portions is suspended while welding by the tube-welding portions continues; and a source of radiofrequency current electrically connected to at least one of the first and second die members for applying a radiofrequency electric field to the opposing sheets and tube when the first and second die members press the opposing sheets and tube for welding the opposing sheets and tube.

14. An apparatus for forming a bag assembly as set forth in claim 13 wherein the perimeter-welding portion of the second die member is movable relative to the tube-welding portion of the second die member when the first die member and the second die member press the opposing sheets and tube to permit an increase in spacing between the perimeter-welding portion of the first die member and the perimeter-welding portion of the second die member.

15. An apparatus for forming a bag assembly as set forth in claim 14 further comprising a retaining device for retaining the spacing of the tube-welding portion of the first die member and the tube-welding portion of the second die member as the spacing between the perimeter-welding portion of the first die member and the perimeter-welding portion of the second die member is increased.

16. An apparatus for forming a bag assembly as set forth in claim 15 wherein said retaining device exerts a force on the tube-welding portion of the first die member independent from the perimeter-welding portion of the first die member to retain the spacing of the tube-welding portion of the first die member and the tube-welding portion of the second die member as the spacing between the perimeter-welding portion of the first die member and the perimeter-welding of the second die member is increased.

17. An apparatus for forming a bag assembly as set forth in claim 16 wherein the tube-welding portion of the first die member is slidably engaged with the perimeter-welding portion of the first die member, and the tube-welding portion of second die member is slidable engaged with the perimeter-welding portion of the second die member.

18. An apparatus for forming a bag assembly as set forth in claim 17 wherein the tube-welding portions of the first and second die members each include at least one tab extending laterally therefrom that is received in a slot of the respective perimeter-welding portion of the first and second die members.

19. An apparatus for forming a bag assembly as set forth in claim 18 wherein perimeter-welding portions of the first and second die members each include a recess defined by sidewalls, respective tube-welding portions of the first and second die members being received in the recess.

20. An apparatus for forming a bag assembly as set forth in claim 18 wherein the retaining device comprises at least one spring.

21. An apparatus for forming a bag assembly as set forth in claim 16 further comprising a press device engaged with at least one of the first and second die members for bringing the first and second die members together and for increasing the spacing between the perimeter-welding portion of the first die member and the perimeter-welding portion of the second die member while allowing the retaining device to retain the spacing of the tube-welding portion of the first die member and the tube-welding portion of the second die member.

22. An apparatus for forming a bag assembly as set forth in claim 13 wherein the first and second die members are connected in series to the source of radiofrequency energy.

23. An apparatus for forming a bag assembly as set forth in claim 21 further comprising a controller configured to automatically decrease without eliminating an output of the source of radiofrequency energy after the perimeter-welding portion of the first die member is moved away from the perimeter-welding potion of the second die member.

24. An apparatus for forming a bag assembly as set forth in claim 13 wherein each tube-welding portion of the first die member and the second die member includes a tube-welding electrode having a low-profile arcuate surface for at least partially flattening the tube and a resiliently deformable insert in the tube during welding.

25. An apparatus for forming a bag assembly as set forth in claim 13 wherein the tube-welding portion and the perimeter-welding portion are arranged to form contiguous welded areas.

26. A method of forming a bag assembly as set forth in claim 1 wherein the step of pressing the subassembly with the first and second die members comprises forming contiguous weld areas in the bag assembly between the portion of said one of the first and second die members that is moved away from the other of the first and second die members and the portion of said one of the first and second die members that is maintained in the first location.

* * * * *